(12) United States Patent
Kim et al.

(10) Patent No.: US 11,880,523 B2
(45) Date of Patent: Jan. 23, 2024

(54) TOUCH DISPLAY DEVICE AND GATE DRIVING CIRCUIT

(71) Applicant: LG Display Co., Ltd., Seoul (KR)

(72) Inventors: Sungju Kim, Paju-si (KR); DongHoon Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/749,628

(22) Filed: May 20, 2022

(65) Prior Publication Data

US 2023/0095759 A1 Mar. 30, 2023

(30) Foreign Application Priority Data

Sep. 30, 2021 (KR) .................. 10-2021-0129743

(51) Int. Cl.
*G06F 3/041* (2006.01)
*G06F 3/044* (2006.01)
*G09G 3/3266* (2016.01)

(52) U.S. Cl.
CPC ........ *G06F 3/0412* (2013.01); *G06F 3/04164* (2019.05); *G06F 3/04166* (2019.05); *G09G 3/3266* (2013.01); *G06F 3/0445* (2019.05); *G06F 3/0446* (2019.05); *G09G 2300/0408* (2013.01); *G09G 2310/0286* (2013.01)

(58) Field of Classification Search
None
See application file for complete search history.

(56) References Cited

U.S. PATENT DOCUMENTS

| 2005/0122827 | A1* | 6/2005 | Wang | G09G 3/3677 365/232 |
| 2015/0106646 | A1* | 4/2015 | Lee | G09G 3/3677 713/400 |
| 2018/0151144 | A1* | 5/2018 | Kawashima | G09G 3/3677 |
| 2018/0204889 | A1* | 7/2018 | Yu | H10K 59/131 |
| 2019/0392915 | A1* | 12/2019 | Zhu | G09G 3/3674 |
| 2020/0235725 | A1* | 7/2020 | Lee | H03K 7/08 |

\* cited by examiner

*Primary Examiner* — Krishna P Neupane
(74) *Attorney, Agent, or Firm* — Seed IP Law Group LLP

(57) ABSTRACT

Embodiments of the present disclosure relate to a touch display apparatus and a gate driving circuit, and more particularly, provide a touch display apparatus including: two or more signal lines that transmit clock signals having the same frequency and different phases; and a multiplexer including input nodes through which clock signals transmitted through the two or more signal lines are input and an output node outputting any one of clock signals input to the input nodes. According to the embodiments of the present disclosure, touch sensing accuracy and display quality are possible to be improved.

20 Claims, 12 Drawing Sheets

TOUCH DISPLAY DEVICE AND GATE DRIVING CIRCUIT

CROSS-REFERENCE TO RELATED APPLICATIONS

This application claims the benefit and priority from Korean Patent Application No. 10-2021-0129743, filed in the Republic of Korea on Sep. 30, 2021, the entire contents of which are hereby incorporated by reference for all purposes as if fully set forth into the present application.

BACKGROUND

Technical Field

Embodiments of the present disclosure relate to a touch display device (or apparatus) and a gate driving circuit.

Description of the Related Art

As the information society develops, demands for a display device (or apparatus) for displaying an image are increasing in various forms, and in recent years, various display devices such as a liquid crystal display device and an organic light emitting display device are used.

In order to provide more various functions to the user, the display device may provide a function of recognizing a user's touch on the display panel and performing input processing based on the recognized touch.

For example, a touch-recognizable display device includes multiple touch electrodes disposed or embedded in a display panel, and may detect whether a user touches the display panel and touch coordinates by driving the touch electrode.

BRIEF SUMMARY

A display panel of a touch-recognizable display device may include lines for image display and lines for touch sensing by displaying an image and providing a touch sensing function. In some cases, lines for image display and lines for touch sensing may be disposed adjacent to each other, and as both lines transmit signals of similar frequencies, a signal interference problem may occur between both lines. Accordingly, there are problems in that display quality is deteriorated, and touch sensing accuracy is lowered in a specific area.

One or more embodiments of the present disclosure may provide a gate driving circuit capable of improving a screen shaking phenomenon and a touch display device with improved display quality by improving a screen shaking phenomenon.

One or more embodiments of the present disclosure may provide a gate driving circuit capable of improving touch sensing accuracy of a touch electrode adjacent to a non-active area and a touch display device with improved touch sensing accuracy.

According to one embodiment of the present disclosure, there is a touch display device including: two or more signal lines that transmit clock signals having the same frequency and different phases, and a multiplexer including input nodes through which clock signals transmitted through the two or more signal lines are input and an output node outputting any one of clock signals input to the input nodes.

According to another embodiment of the present disclosure, there is a gate driving circuit including: a multiplexer including two or more input nodes and one or more output node, and a gate signal output circuit that receives a signal output from an output node of the multiplexer and generates a gate signal input to a sub-pixel.

According to embodiments of the present disclosure, it is possible to provide a gate driving circuit capable of improving a screen shaking phenomenon and a touch display device with improved display quality by improving a screen shaking phenomenon.

According to embodiments of the present disclosure, it is possible to provide a gate driving circuit capable of improving touch sensing accuracy of a touch electrode adjacent to a non-active area and a touch display device with improved touch sensing accuracy.

The above are example technical benefits that is expected from the present disclosure and one or more embodiments and the combination thereof may provide other technical benefits that are not mentioned above. Further, the embodiments provided herein address one or more problems in the related art including the example technical problem identified above.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which.

DETAILED DESCRIPTION

Figure 1:
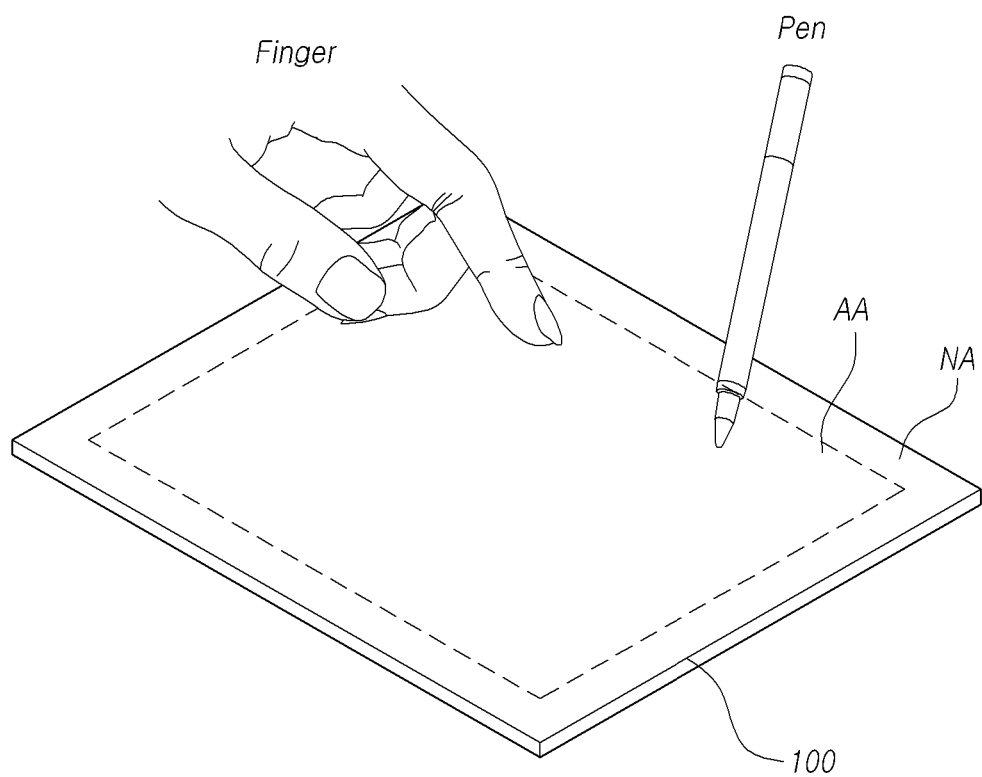
FIG. 1 is a diagram illustrating a touch display device according to embodiments of the present specification.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

The shapes, sizes, dimensions (e.g., width, length, height, thickness, area, radius, diameter, etc.), ratios, angles, the number of elements, and the like illustrated in the accompanying drawings for describing the embodiments of the present disclosure are merely examples, and the present disclosure is not limited thereto.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to the accompanying drawings.

FIG. 1 is a diagram illustrating a touch display device (or apparatus) 100 according to embodiments of the present specification.

The touch display device 100 according to an embodiment of the present specification may provide a touch sensing function using a finger and/or a pen together with an image display function.

Here, the 'pen' may include an active pen or a passive pen. The active pen may have a signal transmission/reception function, may perform an interlocking operation with the touch display device 100, or may have its own power source. The passive pen may refer to a pen that does not have a signal transmission/reception function and its own power supply.

The touch display device 100 may include an active area AA in which an image is displayed and a non-active area NA around the active area AA.

The touch display device 100 according to the embodiments of the present specification may be, for example, a television (TV), a monitor, or the like, or a mobile device such as a tablet or a smart phone.

The touch display device 100 according to the embodiments of the present specification may include a display part configured to provide an image display function and a touch sensing part configured to provide a touch sensing function.

Hereinafter, structures of a display part and a touch sensing part of the touch display device 100 will be briefly described with reference to FIGS. 2 to 4.

Figure 2:
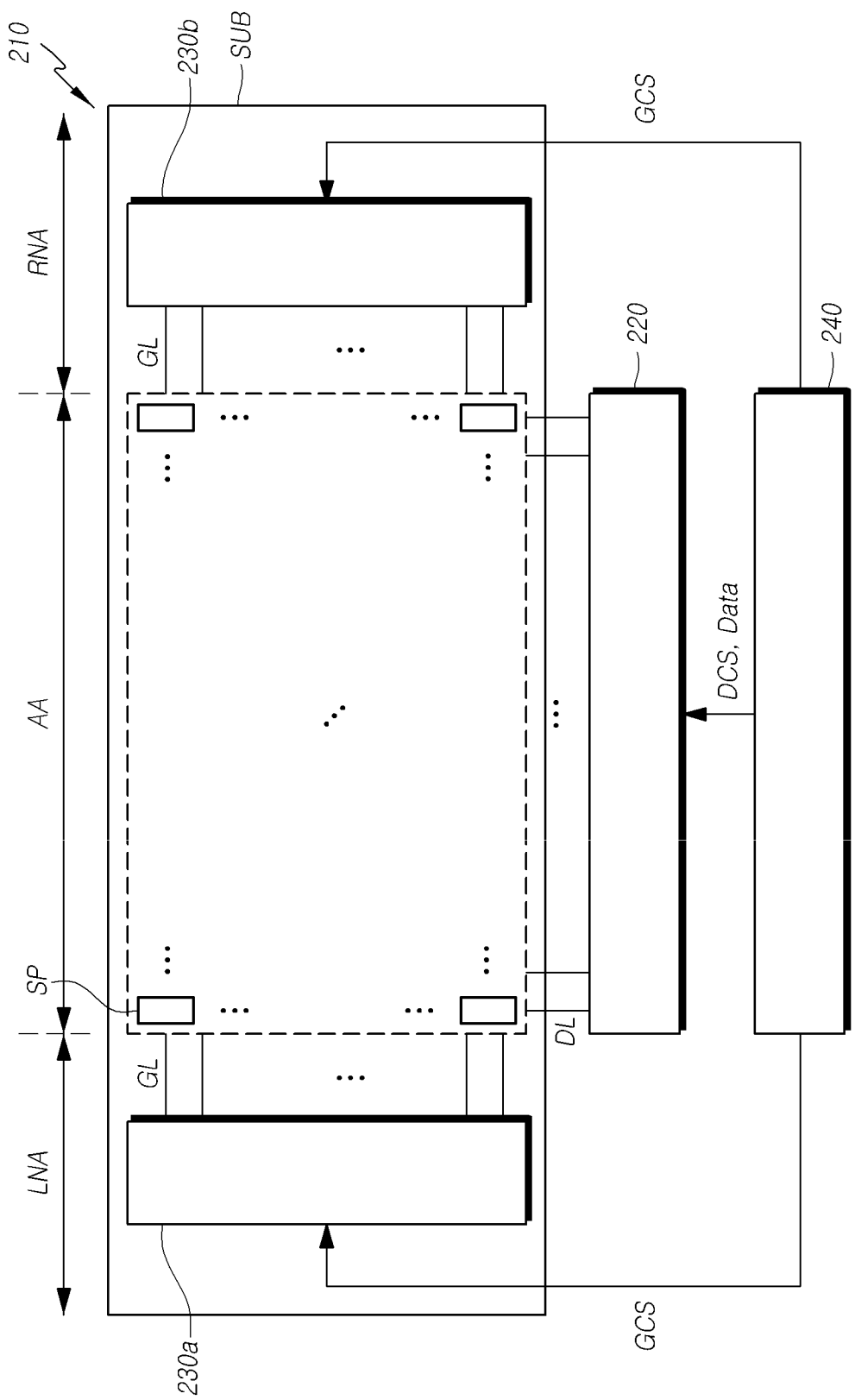
FIG. 2 is a diagram illustrating a display part in a touch display device according to embodiments of the present specification.

FIG. 2 is a diagram illustrating a display part in the touch display device 100 according to embodiments of the present specification.

Referring to FIG. 2, a display part of the touch display device 100 according to embodiments of the present specification includes a display panel 210, a data driving circuit 220, gate driving circuits 230a and 230b, and a display controller 240, and the like.

A plurality of data lines DL and a plurality of gate lines GL are disposed in the active area AA of the display panel 210. A plurality of sub-pixels SP may be disposed in a region where the plurality of data lines DL and the plurality of gate lines GL overlap.

The non-active areas LNA and RNA of the display panel 210 are areas, in which an input image is not displayed, and the sub-pixels SP are not disposed, and various signal lines and a gate driving circuit 230a and 230b may be disposed.

The data driving circuit 220 is configured to supply a data voltage to the plurality of data lines DL to drive the plurality of data lines DL.

The gate driving circuits 230a and 230b are configured to drive the plurality of gate lines GL by supplying a scan signal to the plurality of gate lines GL.

The display controller 240 supplies the data driving circuit control signal DCS and the gate driving circuit control signal GCS to the data driving circuit 220 and the gate driving circuits 230a and 230b to control the data driving circuit 220 and the gate driving circuits 230a and 230b.

The display controller 240 converts externally input image data to match the data signal format used by the data driving circuit 220 and outputs the converted image data Data.

The display controller 240 may be a timing controller used in a typical display technology or a control device that further performs other control functions including the timing controller.

The display controller 240 may be implemented as a separate component from the data driving circuit 220, or may be implemented as an integrated circuit together with the data driving circuit 220.

The data driving circuit 220 may be implemented by including at least one source driver integrated circuit (SDIC).

Each source driver integrated circuit SDIC may include a shift register, a latch circuit, a digital-to-analog converter (DAC), an output buffer, and the like.

Each source driver integrated circuit SDIC may further include an analog-to-digital converter (ADC) in some cases.

The gate driving circuits 230a and 230b may be implemented by including at least one gate driver integrated circuit (GDIC).

Each gate driver integrated circuit (GDIC) may include a shift register, a level shifter, and the like.

The data driving circuit 220 may be located on one side (e.g., upper or lower side) of the display panel 210, and in some cases, and may be located on opposite sides (e.g., upper and lower sides) of the display panel 210 according to a driving method or a panel design.

The gate driving circuit 230a and 230b may be located on one side (e.g., left or right side) of the display panel 210, and may be located on opposite sides (e.g., left and right sides) of the display panel 210 according to a driving method or a panel design.

The gate driving circuits 230a and 230b may be implemented in the form of a gate in panel (GIP) formed in the form of a thin film transistor on the non-active areas LNA and RNA on the display panel 210.

The gate driving circuits 230a and 230b may include a scan signal generating circuit for outputting a scan signal used to turn on or turn off the switching transistors included in the sub-pixels SP.

The gate driving circuits 230a and 230b may be arranged in a plurality of stages (ST) in the non-active area LNA and RNA.

Figure 3:
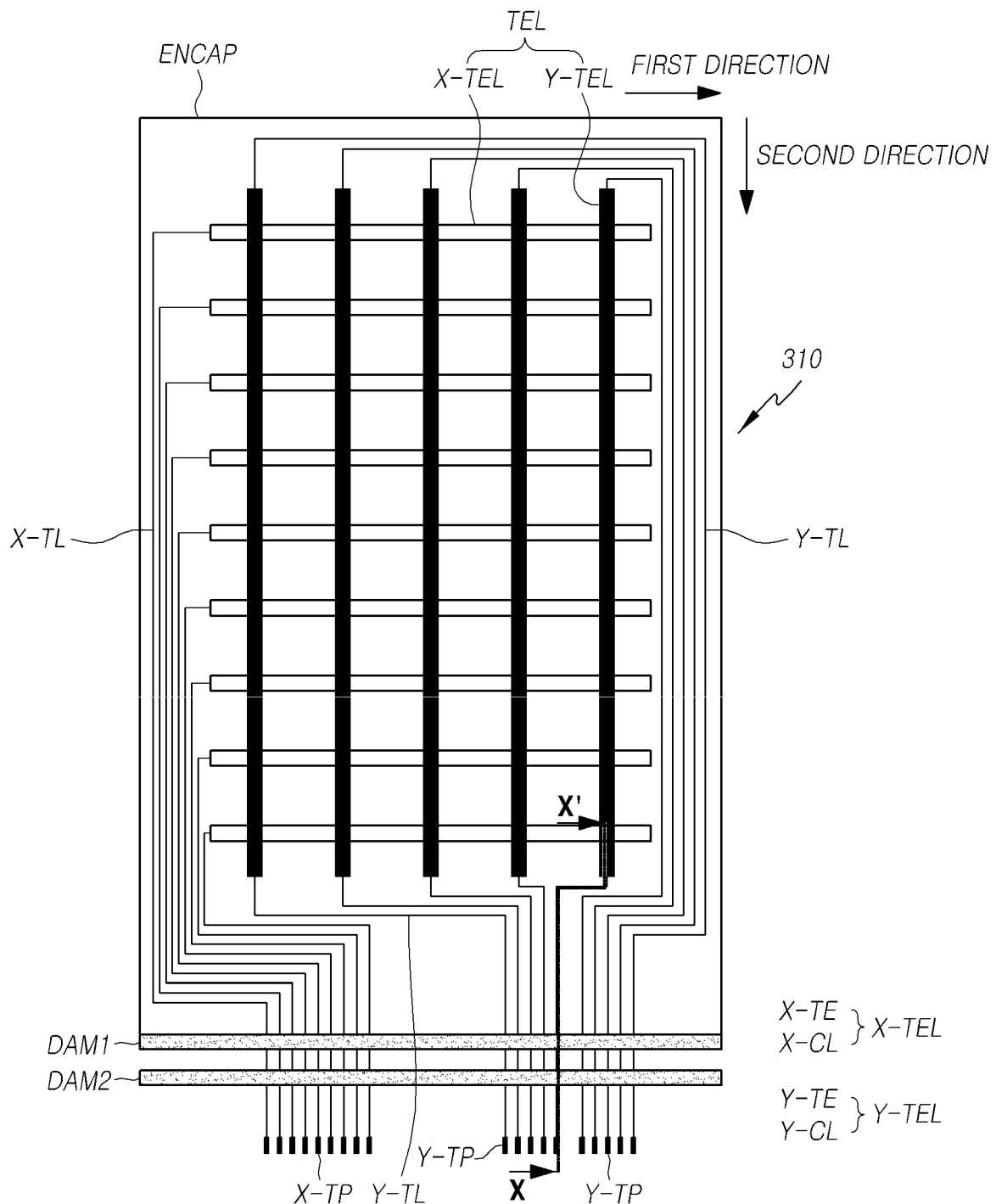
FIG. 3 is a diagram illustrating a structure of a touch sensor in the touch panel of the present specification.

FIG. 3 is a diagram illustrating a structure of a touch sensor in the touch panel of the present specification.

The touch panel 310 of the present specification may include one or more touch electrodes for providing a touch sensing function, and at least one touch routing line electrically connected to the touch electrodes.

The touch panel 310 may exist outside the display panel 210 of FIG. 2 described above. That is, the touch panel 310 and the display panel 210 may be separately manufactured and combined. Such a touch panel 310 is called an external type or an add-on type.

Alternatively, the touch panel 310 may be built in the display panel 210. That is, when manufacturing the display panel 210, a touch sensor structure such as a plurality of touch electrodes and a plurality of touch routing lines constituting the touch panel 310 together with electrodes and signal lines for driving the display may be formed. Such a touch panel 310 is referred to as a built-in type or an in-cell type. Hereinafter, for convenience of description, the case in which the touch panel 310 is a built-in type will be described as an example.

The touch display device 100 according to the embodiments of the present specification, as a capacitance-based touch sensing method, may sense a touch using a mutual capacitance method or may sense a touch using a self-capacitance method.

In the case of a touch sensing method based on a mutual capacitance method, a plurality of touch electrodes may be divided into a touch driving electrode and a touch sensing electrode. A touch driving signal is applied to the touch driving electrode through a touch driving line. The touch sensing electrode is electrically connected to a touch sensing line to which a touch sensing signal is applied, and forms a capacitance with the touch driving electrode. In this case, the touch line including the touch driving line and the touch sensing line may be referred to as a touch line, and the touch signal including the touch driving signal and the touch sensing signal may be referred to as a touch signal.

In the case of such a mutual capacitance-based touch sensing method, the touch display device may detect the presence or absence of a touch and touch coordinates, based on a change in the mutual capacitance according to the presence or absence of a pointer such as a finger or a pen.

In the case of a self-capacitance-based touch sensing method, each touch electrode may perform both a role of a touch driving electrode and a role of a touch sensing electrode. That is, a touch driving signal is applied to the touch electrode through one touch line, and a touch sensing signal transmitted from the touch electrode to which the touch driving signal is applied is received through the same touch line. Accordingly, in the self-capacitance-based touch sensing method, there is no distinction between the touch driving electrode and the touch sensing electrode and no distinction between the touch driving line and the touch sensing line.

In the case of such a self-capacitance-based touch sensing method, the presence or absence of a touch and/or touch coordinates may be detected based on a change in capacitance generated between a pointer such as a finger or a pen and a touch electrode.

Referring to FIG. 3, the touch display device 100 (refer to FIG. 1) according to embodiments of the present specification may have a touch sensing method based on mutual capacitance sensing method.

In the touch display device 100 according to the embodiments of the present specification, the mutual capacitance-based touch sensing structure includes a plurality of X-touch electrode lines (X-TEL) and a plurality of Y-touch electrode lines (Y-TEL).

The plurality of X-touch electrode lines X-TEL and the plurality of Y-touch electrode lines Y-TEL may be positioned on the encapsulation unit ENCAP.

The plurality of X-touch electrode lines X-TEL may be disposed in a first direction, and the plurality of Y-touch electrode lines Y-TEL may be disposed in a second direction different from the first direction.

For example, the first direction may be an x-axis direction, and the second direction may be a y-axis direction. Conversely, the first direction may be a y-axis direction, and the second direction may be an x-axis direction. In addition, the first direction and the second direction may be orthogonal to each other, but may not be orthogonal to each other.

The plurality of X-touch electrode lines X-TEL may include a plurality of X-touch electrodes electrically connected to each other. The plurality of Y-touch electrode lines Y-TEL may include a plurality of electrically connected Y-touch electrodes.

The plurality of X-touch electrodes and the plurality of Y-touch electrodes may be electrodes whose functions are distinguished from each other.

For example, the plurality of X-touch electrodes may be touch driving electrodes, and the plurality of Y-touch electrodes may be touch sensing electrodes. In this case, the plurality of X-touch electrode lines X-TEL correspond to touch driving electrode lines, and the plurality of Y-touch electrode lines Y-TEL correspond to touch sensing electrode lines.

Conversely, the plurality of X-touch electrodes may be touch sensing electrodes, and the plurality of Y-touch electrodes may be touch driving electrodes. In this case, the plurality of X-touch electrode lines X-TEL correspond to touch sensing electrode lines, and the plurality of Y-touch electrode lines Y-TEL correspond to touch driving electrode lines.

Referring to FIG. 3, one or more touch routing lines (TL) may be included in the structure of the touch sensor.

The touch routing line TL may include an X-touch routing line X-TL electrically connected to the X-touch electrode line X-TEL, and may include a Y-touch routing line Y-TL electrically connected to the Y-touch electrode line Y-TEL.

The X-touch electrode line X-TEL may include a plurality of X-touch electrodes disposed in the same row (or column) and one or more X-touch electrode connecting lines (not shown) that electrically connect them. Here, the X-touch electrode connection line electrically connecting the two adjacent X-touch electrodes may be a metal integrated with two adjacent X-touch electrodes, and may be a metal to be connected to the two adjacent X-touch electrodes through a contact hole.

In a region where the X-touch electrode line X-TEL and the Y-touch electrode line Y-TEL overlap, the X-touch electrode connection line and the Y-touch electrode connection line (not shown) may cross each other.

In a region where the X-touch electrode line X-TEL and the Y-touch electrode line Y-TEL overlap, the X-touch electrode connection line and the Y-touch electrode connection line may cross each other. When the X-touch electrode connection line and the Y-touch electrode connection line cross each other, the X-touch electrode connection line and the Y-touch electrode connection line may be located on different layers.

To arrange the plurality of X-touch electrode lines X-TEL and the plurality of Y-touch electrode lines Y-TEL to cross each other, a plurality of X-touch electrodes, a plurality of X-touch electrode connection lines, a plurality of Y-touch electrodes, and a plurality of Y-touch electrode connection lines may be positioned in two or more layers.

The plurality of X-touch electrode lines X-TEL are electrically connected to the corresponding X-touch pads X-TP through one or more X-touch routing lines X-TL. That is, the outermost X-touch electrode among the plurality of X-touch electrodes included in one X-touch electrode line X-TEL is electrically connected to the X-touch pad X-TP thorough the X-touch routing line X-TL.

The plurality of Y-touch electrode lines Y-TEL are electrically connected to the corresponding Y-touch pads Y-TP through one or more Y-touch routing lines Y-TL. That is, the outermost Y-touch electrode among the plurality of Y-touch electrodes included in one Y-touch electrode line Y-TEL is electrically connected to the Y-touch pad Y-TP thorough the Y-touch routing line Y-TL.

Here, when the plurality of X-touch electrodes constituting the plurality of X-touch electrode lines X-TEL are touch driving electrodes, a plurality of touch driving signals are transmitted to the X-touch electrode through the plurality of X-touch routing lines X-TL. In addition, when the plurality of Y-touch electrodes constituting the plurality of Y-touch electrode lines Y-TEL are touch sensing electrodes, the touch sensing signal generated from the plurality of Y-touch electrodes is supplied to the touch driving circuit (not shown) through Y-touch routing line Y-TL.

At this time, the plurality of X-touch routing lines X-TL and the plurality of Y-touch routing lines Y-TL may extend along the non-active area NA located outside the active area AA. A plurality of X-touch routing lines X-TL and a plurality of Y-touch routing lines Y-TL may partially overlap in the non-active area NA.

For example, when a plurality of X-touch routing lines X-TL and a plurality of Y-touch routing lines Y-TL are formed on different layers in the non-active area NA, the plurality of X-touch routing lines X-TL and the plurality of Y-touch routing lines Y-TL may overlap in some sections of the outer portion of the active area AA.

In this case, in an area adjacent to the touch pad TP, the touch routing lines X-TL and Y-TL may have a single electrode structure for transmitting a touch signal. Alternatively, it may be formed of a double-stacked structure connected to at least one contact hole to reduce electrical resistance to a touch signal or to prepare for a disconnection.

When the touch routing lines X-TL and Y-TL are formed in a double stacked structure, a touch bridge line (not shown) may be positioned in the vertical upper or vertical lower position of the touch routing lines X-TL and Y-TL, extending in the same direction as the touch routing lines X-TL and Y-TL In the non-active area NA, one or more contact hoes electrically connecting the touch routing lines X-TL and Y-TL and the touch bridge line may be formed at regular intervals.

On the other hand, when a plurality of X-touch routing lines X-TL and a plurality of Y-touch routing lines Y-TL are formed on the same layer, there may be no overlapping regions.

Figure 4:
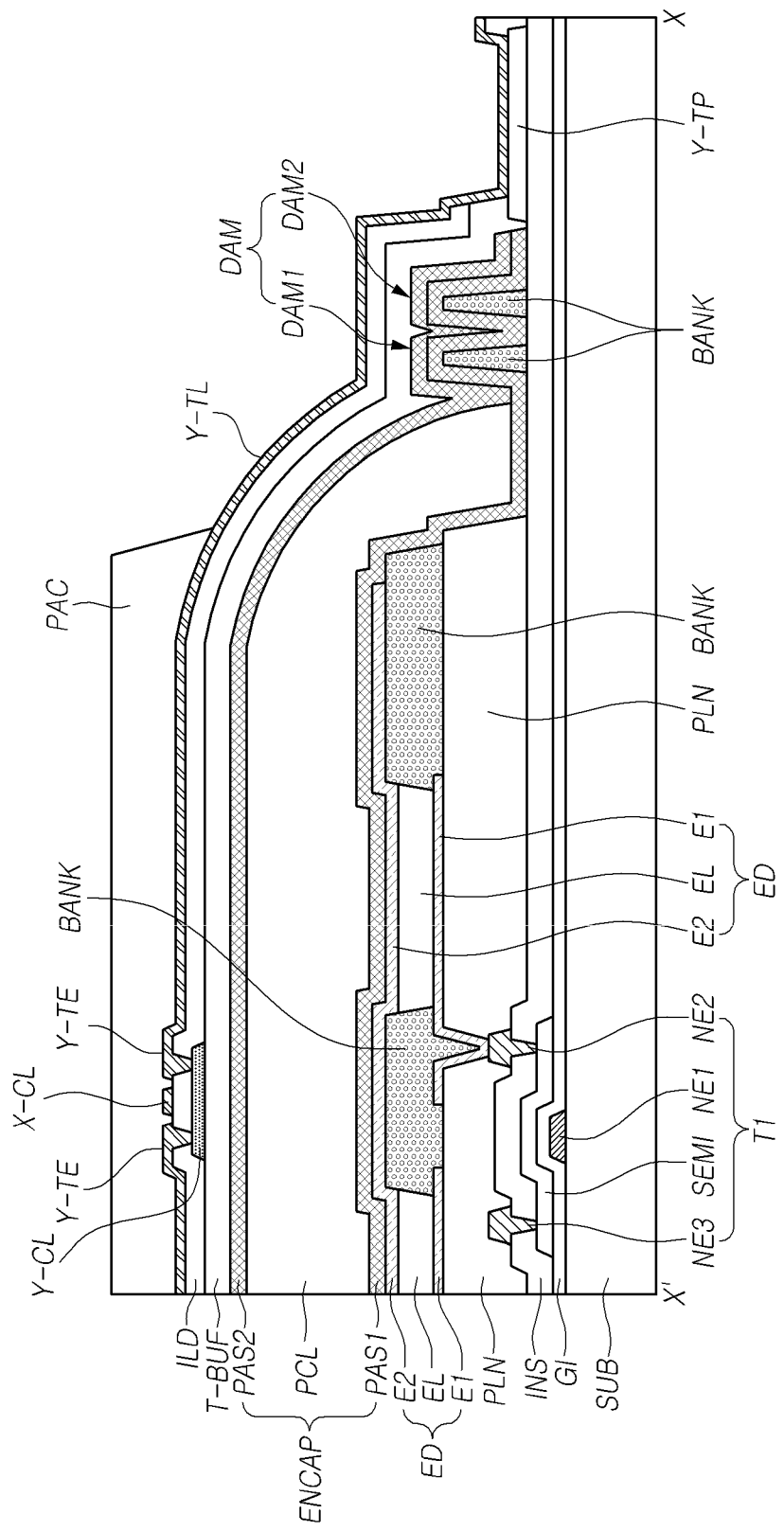
FIG. 4 is a partial cross-sectional view of the touch panel of the present specification, and is a view showing an example of a cross-sectional structure of the portion X-X' shown in FIG. 3.

FIG. 4 is a partial cross-sectional view of the touch panel of the present specification, and is a view showing an example of a cross-sectional structure of the portion X-X' shown in FIG. 3.

In FIG. 4, the touch electrode (e.g., the Y-touch electrode Y-TE) is illustrated in a plate shape, but this is only an example and may be in a mesh type. In addition, when the touch electrode is a mesh type, the opening of the touch electrode may be located on the light emitting area of the sub-pixel.

A first transistor T1 that controls a current supplied to the light emitting device ED disposed in each sub-pixel of the active region may be disposed on the substrate SUB. The first transistor T1 may be a driving transistor configured to drive the light emitting device ED.

The first transistor T1 includes a first node electrode NE1 corresponding to a gate electrode, a second node electrode NE2 corresponding to any one of a source electrode or a drain electrode, a third node electrode NE3 corresponding to the other electrode of a source electrode or a drain electrode, a semiconductor layer SEMI, and the like.

The first node electrode NE1 and the semiconductor layer SEMI may overlap with the gate insulating layer GI interposed therebetween. The second node electrode NE2 is formed on the insulating layer INS to contact one side of the semiconductor layer SEMI, and the third node electrode NE3 is formed on the insulating layer INS to contact the other side of the semiconductor layer SEMI.

The light emitting element ED may include a first electrode E1 corresponding to an anode electrode (or a cathode electrode), a light emitting layer EL formed on the first electrode E1, and a cathode electrode (or a anode electrode) formed on the light emitting layer EL, and the like.

The first electrode E1 is electrically connected to the second node electrode NE2 of the first transistor T1 exposed through the pixel contact hole penetrating the planarization layer PLN.

The light emitting layer EL is formed on the first electrode E1 of the light emitting area provided by the bank BANK. The light-emitting layer EL is formed by stacking the hole-related layer, the light-emitting layer, and the electron-related layer on the first electrode E1 in the order or in the reverse order. The second electrode E2 is formed to face the first electrode E1 with the light emitting layer EL interposed therebetween.

The encapsulation unit ENCAP is disposed on a light emitting device ED that is vulnerable to external moisture or oxygen, and blocks the penetration of external moisture or oxygen.

The encapsulation unit ENCAP may be disposed as one layer, or may be disposed as a plurality of layers PAS1, PCL, and PAS2 as shown in FIG. 4. For example, when the encapsulation unit ENCAP consists of a plurality of layers PAS1, PCL, and PAS2, the encapsulation unit ENCAP may include one or more inorganic encapsulation layers PAS1 and PAS2, and one or more organic encapsulation layers PCL. As a specific example, the encapsulation unit ENCAP may be disposed in a structure in which the first inorganic encapsulation layer PAS1, the organic encapsulation layer PCL, and the second inorganic encapsulation layer PAS2 are sequentially stacked.

Here, the organic encapsulation layer PCL may further include at least one organic encapsulation layer or at least one inorganic encapsulation layer.

The first inorganic encapsulation layer PAS1 is formed on the substrate SUB on which the second electrode E2 corresponding to the cathode electrode of the light emitting device ED is formed so as to be closest to the light emitting device ED. The first inorganic encapsulation layer PAS1 is formed of, for example, an inorganic insulating material capable of low-temperature deposition, such as silicon nitride (SiNx), silicon oxide (SiOx), silicon oxynitride (SiON), or aluminum oxide ($Al_2O_3$). Since the first inorganic encapsulation layer PAS1 is deposited at a low temperature, the first inorganic encapsulation layer PAS1 may prevent the light emitting layer EL including an organic material vulnerable to high temperature from being damaged during the deposition process.

The organic encapsulation layer PCL may have a smaller area than the first inorganic encapsulation layer PAS1. In this case, the organic encapsulation layer PCL may be formed to expose both ends of the first inorganic encapsulation layer PAS1.

The organic encapsulation layer PCL may serve as a buffer for relieving stress between layers due to bending of the organic light emitting touch display device, and may serve to enhance planarization performance. The organic encapsulation layer PCL may be formed of, for example, an organic insulating material such as acrylic resin, epoxy resin, polyimide, polyethylene, or silicon oxycarbon (SiOC).

On the other hand, when the organic encapsulation layer PCL is formed through the inkjet method, in the boundary area between the non-active area NA and the active area AA, or in a dam area corresponding to a partial area within the non-active area NA, One or two or more dams DAM may be formed.

For example, referring to FIGS. 3 and 4 together, the dam area may be located in the non-active area NA. The dam area may be positioned between the active area AA and the pad area in which the plurality of X-touch pads X-TP and the plurality of Y-touch pads Y-TP are formed. In the dam area, a primary dam DAM1 adjacent to the active area AA and a secondary dam DAM2 adjacent to the pad area may exist.

The one or more dams DAM disposed in the dam area may prevent the liquid organic encapsulation layer PCL from collapsing in the non-active area NA and encroaching on the pad area, when the liquid organic encapsulation layer PCL is laminated on the active area AA.

This effect may be greater when the primary dam DAM1 and the secondary dam DAM2 are provided, as shown in FIGS. 3 and 4.

The primary dam DAM1 and/or the secondary dam DAM2 may be formed in a single-layer or multi-layer structure. For example, the primary dam DAM1 and/or the secondary dam DAM2 may be simultaneously formed of the same material as at least one of a bank BANK and a spacer (not shown). In this case, the dam structure may be formed without a separate mask addition process and cost increase.

In addition, the primary dam DAM1 and/or the secondary dam DAM2 may be formed by stacking the first inorganic encapsulation layer PAS1 or the second inorganic encapsulation layer PAS2 on the bank BANK, as shown in FIG. 4.

In addition, the organic encapsulation layer PCL including an organic material may be positioned only on the inner surface of the primary dam DAM1 as shown in FIG. 4. Alternatively, the organic encapsulation layer PCL including an organic material may also be positioned on at least a portion of the primary dam DAM1 and the secondary dam DAM2. For example, the organic encapsulation layer PCL may be positioned on the primary dam DAM1.

The second inorganic encapsulation layer PAS2 may be formed on the substrate SUB on which the organic encapsulation layer PCL is formed to cover the top surface and the side surface of each of the organic encapsulation layer PCL and the first inorganic encapsulation layer PAS1. The second inorganic encapsulation layer PAS2 may minimize (or reduce) or block external moisture or oxygen from penetrating into the organic encapsulation layer PCL and the first inorganic encapsulation layer PAS1. The second inorganic encapsulation layer PAS2 may be formed of, for example, an inorganic insulating material such as silicon nitride (SiNx), silicon oxide (SiOx), silicon oxynitride (SiON), or aluminum oxide ($Al_2O_3$).

A touch buffer layer T-BUF may be disposed on the encapsulation unit ENCAP.

The touch buffer layer T-BUF may be positioned between the touch sensor metal, including an X-touch electrode (not shown), a Y-touch electrode Y-TE, an X-touch electrode connection line X-CL, and a Y-touch electrode connection line Y-CL, and the second electrode E2 of the light emitting device ED.

The touch buffer layer T-BUF may be designed such that the separation distance between the touch sensor metal and the second electrode E2 of the light emitting device ED maintains a predetermined minimum separation distance (e.g., 1 μm). Accordingly, it is possible to reduce or prevent a parasitic capacitance formed between the touch sensor metal and the second electrode E2 of the light emitting device ED, and through this, it is possible to prevent a decrease in touch sensitivity due to the parasitic capacitance.

Without such a touch buffer layer T-BUF, the X-touch electrode, the Y-touch electrode Y-TE, the X-touch electrode connection line X-CL and the Y-touch electrode connection line Y-CL may be disposed on the encapsulation unit ENCAP.

In addition, the touch buffer layer T-BUF may block a chemical (developer or etchant, etc.) used in the manufacturing process of the touch sensor metal disposed on the touch buffer layer T-BUF or moisture from the outside penetrating into the light emitting layer EL. Accordingly, the touch buffer layer T-BUF may prevent the light emitting layer EL, which is vulnerable to a chemical solution or moisture, from being damaged.

The touch buffer layer T-BUF may be formed at a low temperature below a certain temperature (e.g., 100 degree Celsius (° C.)) to prevent damage to the light emitting layer EL including an organic material that is vulnerable to high temperatures. The touch buffer layer T-BUF may be formed of an acryl-based, epoxy-based, or siloxan-based material. The touch buffer layer T-BUF, which is made of an organic insulating material, and has planarization performance, may prevent each of the encapsulation layers PAS1, PCL and PAS2 constituting the encapsulation unit ENCAP from being damaged due to the bending of the touch display device. The touch buffer layer T-BUF may prevent the touch sensor metal formed on the touch buffer layer T-BUF from being broken as the touch display device is bent.

In some cases, the touch buffer layer T-BUF may be omitted as it is not positioned on the encapsulation unit ENCAP. For example, the touch sensor metal may be directly disposed on the encapsulation unit ENCAP without disposing the touch buffer layer T-BUF by increasing the thickness of the second inorganic encapsulation layer PAS2.

According to the mutual-capacitance-based touch sensor structure, X-touch electrode lines X-TEL (see FIG. 3) and Y-touch electrode lines Y-TEL (see FIG. 3) are disposed on the touch buffer layer T-BUF, and the X-touch electrode lines X-TEL and the Y-touch electrode lines Y-TEL may be disposed to cross each other.

The Y-touch electrode lines Y-TEL may contain a plurality of Y-touch electrodes Y-TE and a plurality of Y-touch electrode connection lines Y-CL electrically connecting the plurality of Y-touch electrodes Y-TE.

Referring to FIG. 4, the plurality of Y-touch electrodes Y-TE and the plurality of Y-touch electrode connection lines Y-CL may be positioned on different layers with the touch insulating layer ILD interposed therebetween. In addition, the Y-touch electrodes Y-TE disposed adjacent to each other in one direction may be electrically connected to each other through the Y-touch electrode connection line Y-CL.

The Y-touch electrode connection line Y-CL may be disposed to overlap the bank BANK. Accordingly, it is possible to prevent a decrease in the aperture ratio due to the Y-touch electrode connection line Y-CL.

The X-touch electrode connection line X-CL is disposed on the same plane as the X-touch electrode X-TE or may be integrally formed with two X-touch electrodes X-TE adjacent in one direction.

The X-touch electrode connection line X-CL may be disposed to overlap the bank BANK. Accordingly, it is possible to prevent a decrease in the aperture ratio due to the X-touch electrode connection line X-CL.

Meanwhile, the Y-touch electrode line Y-TEL may be electrically connected to the touch driving circuit through the Y-touch routing line Y-TL and the Y-touch pad Y-TP. Similarly, the X-touch electrode line X-TEL may be electrically connected to the touch driving circuit through the X-touch routing line X-TL (see FIG. 3) and the X-touch pad X-TP (see FIG. 3).

The touch driving circuit is a circuit that supplies a touch driving signal to the touch panel 310 and detects a touch sensing signal from the touch panel 310.

The touch display device 100 according to the embodiments of the present specification may further include a touch controller (not shown) and the like, which senses the user's touch presence and/or touch position in the touch panel 310 based on a touch sensing signal detected by a touch driving circuit.

The touch driving circuit and the touch controller may be implemented as separate parts or, in some cases, may be integrated into one part.

The X-touch pad X-TP may be formed separately from the X-touch routing line X-TL, or may be formed by extending the X-touch routing line X-TL. The Y-touch pad Y-TP may be formed separately from the Y-touch routing line Y-TL, or may be formed by extending the Y-touch routing line Y-TL.

When the X-touch pad X-TP is formed by extending the X-touch routing line X-TL and the Y-touch pad Y-TP is formed by extending the Y-touch routing line Y-TL, the X-touch pad X-TP, the X-touch routing line X-TL, the Y-touch pad Y-TP, and the Y-touch routing line Y-TL may be made of the same first conductive material. Here, the first conductive material is formed in a single-layer or multi-layer structure using, for example, a metal having high corrosion resistance and acid resistance and good conductivity, such as aluminum (Al), titanium (Ti), copper (Cu), and molybdenum (Mo).

For example, X-touch pad X-TP, X-touch routing line X-TL, Y-touch pad Y-TP and Y-touch routing line Y-TL in a first conductive material may be formed in a three-layered structure, such as Ti/Al/Ti or Mo/Al/Mo.

Meanwhile, a pad cover electrode (not shown) capable of covering the X-touch pad X-TP and the Y-touch pad Y-TP may be further disposed.

The pad cover electrode may be made of a second conductive material. Here, the second conductive material may be formed of a transparent conductive material such as ITO or IZO with strong corrosion resistance and acid resistance. The pad cover electrode may be bonded to the touch driving circuit by being molded to be exposed by the touch buffer layer T-BUF, or may be bonded to the circuit film on which the touch driving circuit is mounted.

The Y-touch routing line Y-TL may be electrically connected to the Y-touch electrode Y-TE through a touch routing line contact hole, or may be integrated with the Y-touch electrode Y-TE.

The Y-touch routing lines Y-TL may extend to the non-active area NA and pass through the top and side surfaces of the encapsulation unit ENCAP, and the top and side surfaces of the dam DAM to the Y-touch pad Y-TP. Accordingly, the Y-touch routing lines Y-TL may be electrically connected to the touch driving circuit through the Y-touch pad Y-TP.

The Y-touch routing line Y-TL may transmit the touch sensing signal from the Y-touch electrode Y-TE to the touch driving circuit, or receive the touch driving signal from the touch driving circuit to Y-touch electrode Y-TE.

The X-touch routing line X-TL may be electrically connected to the X-touch electrode through a touch routing line contact hole, or may be integrated with the X-touch electrode X-TE.

The X-touch routing lines X-TL may extend to the non-active area NA and pass through the top and side surfaces of the encapsulation unit ENCAP, and the top and side surfaces of the dam DAM to the X-touch pad X-TP. Accordingly, the X-touch routing lines X-TL may be electrically connected to the touch driving circuit through the X-touch pad X-TP.

The X-touch routing line X-TL may receive a touch driving signal from the touch driving circuit and transfer a touch driving signal to the X-touch electrode X-TE. Alternatively, the X-touch routing line X-TL may receive a touch sensing signal from the X-touch electrode X-TE and transfer the touch sensing signal to the touch driving circuit.

The arrangement of the X-touch routing line X-TL and the Y-touch routing line Y-TL may be variously changed according to panel design matters.

A touch protection layer PAC may be disposed on the X-touch electrode X-TE and the Y-touch electrode Y-TE. This touch protection layer PAC may be extended to the front or rear of the dam DAM and disposed on the X-touch routing lines X-TL and the Y-touch routing lines Y-TL.

Meanwhile, the cross-sectional view of FIG. 4 conceptually shows the structure, and the position, thickness, or width of each pattern (various layers or various electrodes) may vary depending on the viewing direction or position, and the connection structure of various patterns is also shown. It may be changed, and additional layers may exist in addition to the several illustrated layers, and some of the illustrated various layers may be omitted or integrated. For example, the width of the bank BANK may be narrower than the drawing, and the height of the dam DAM may be lower or higher than the drawing.

In addition, the cross-sectional view of FIG. 4 is a view exemplarily illustrating a structure in which a touch electrode, a touch routing lines TL, etc., are disposed entirely on a sub-pixel, when the touch routing line TL is electrically connected to the touch pad TP along the inclined surface of the encapsulation unit ENCAP. When the touch electrode TE or the like is of a mesh type, the opening of the touch electrode TE may be positioned on the light emitting area of the sub-pixel. In addition, a color filter may be further disposed on the encapsulation unit ENCAP, and the color filter may be located on the touch electrode TE or between the encapsulation unit ENCAP and the touch electrode TE.

Figure 5:
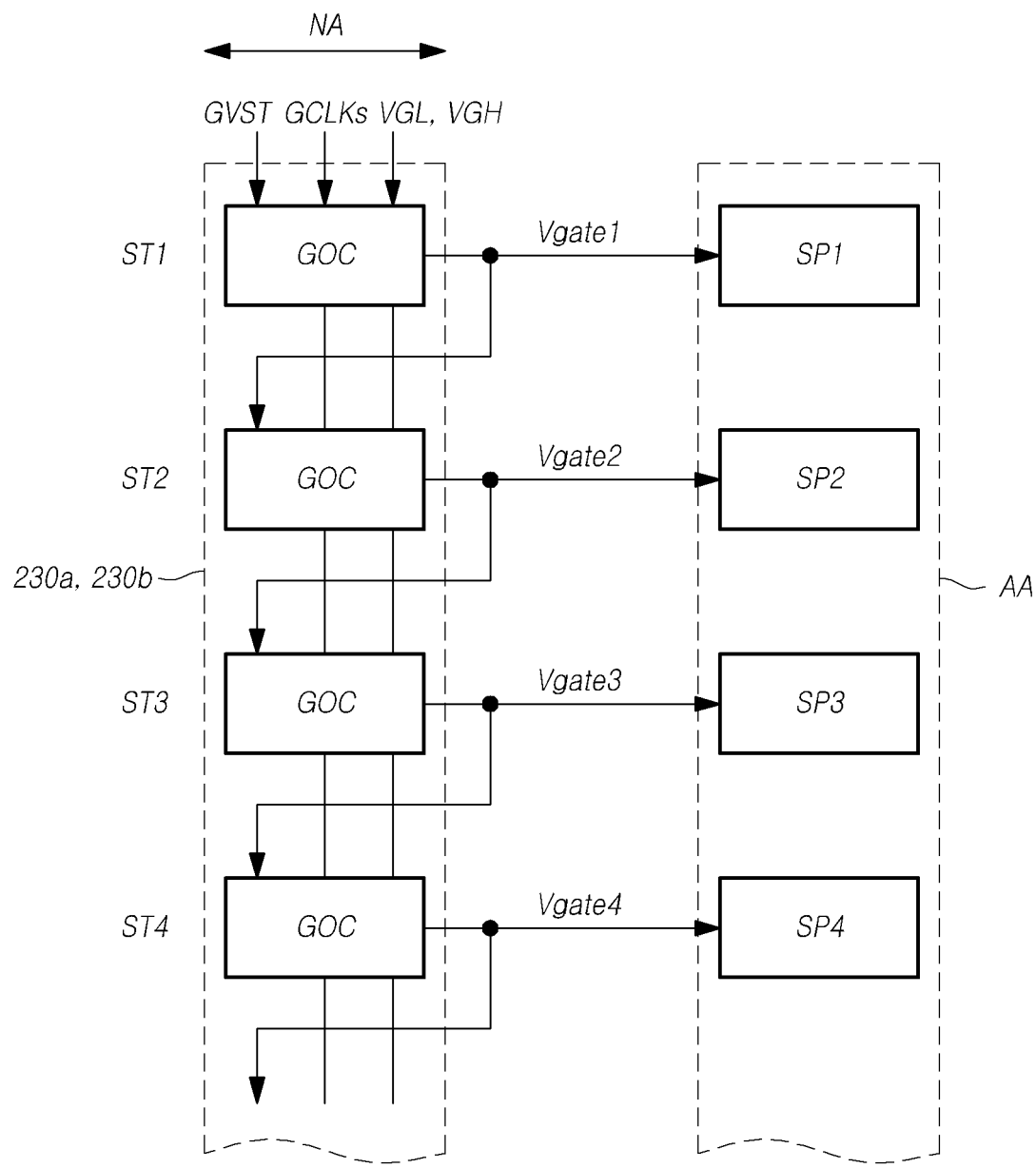
FIG. 5 is a block diagram illustrating a gate driving circuit according to embodiments of the present specification.

FIG. 5 is a block diagram illustrating a gate driving circuit according to embodiments of the present specification.

Referring to FIG. 5, the gate driving circuit includes a gate signal output circuit (GOC).

Referring to FIG. 5, the gate driving circuit may be disposed in a gate-in-panel (GIP) manner in the non-active area NA of the display panel. The gate driving circuit may include a plurality of stages ST1, ST2, ST3, ST4, and the like.

The gate driving circuit operates based on the two-phase gate clock signal GCLKs, the start signal GVST, the low potential gate voltage VGL, and the high potential gate voltage VGH to generate a gate output Vgate. The generated gate output signals (eg, Vgate1, Vgate2, Vgate3, Vgate4, etc.) are supplied to each sub-pixel (e.g., SP1, SP2, SP3, SP4, etc.). Each of the sub-pixels SP1, SP2, SP3, and SP4 may be electrically connected to different gate lines GL (refer to FIG. 2). For example, each of the sub-pixels SP1, SP2, SP3, and SP4 may be arranged in different rows from each other.

Meanwhile, as described above, the gate driving circuit may include a scan signal generating circuit and a light emitting signal generating circuit.

The gate signal Vgate may be a scan signal SCAN for controlling turn-on and turn-off of the switching transistor included in the sub-pixel SP. Alternatively, the gate signal Vgate may be an light emitting signal EM for controlling turn-on and turn-off of the emission control transistor included in the sub-pixel SP.

Hereinafter, for convenience of description, the gate signal output circuit GOC will be described as a circuit configured to output the scan signal SCAN as an example. However, the embodiments of the present specification may be similarly applied to a case in which the gate signal output circuit GOC is a circuit configured to output the light emitting signal EM.

Figure 6:
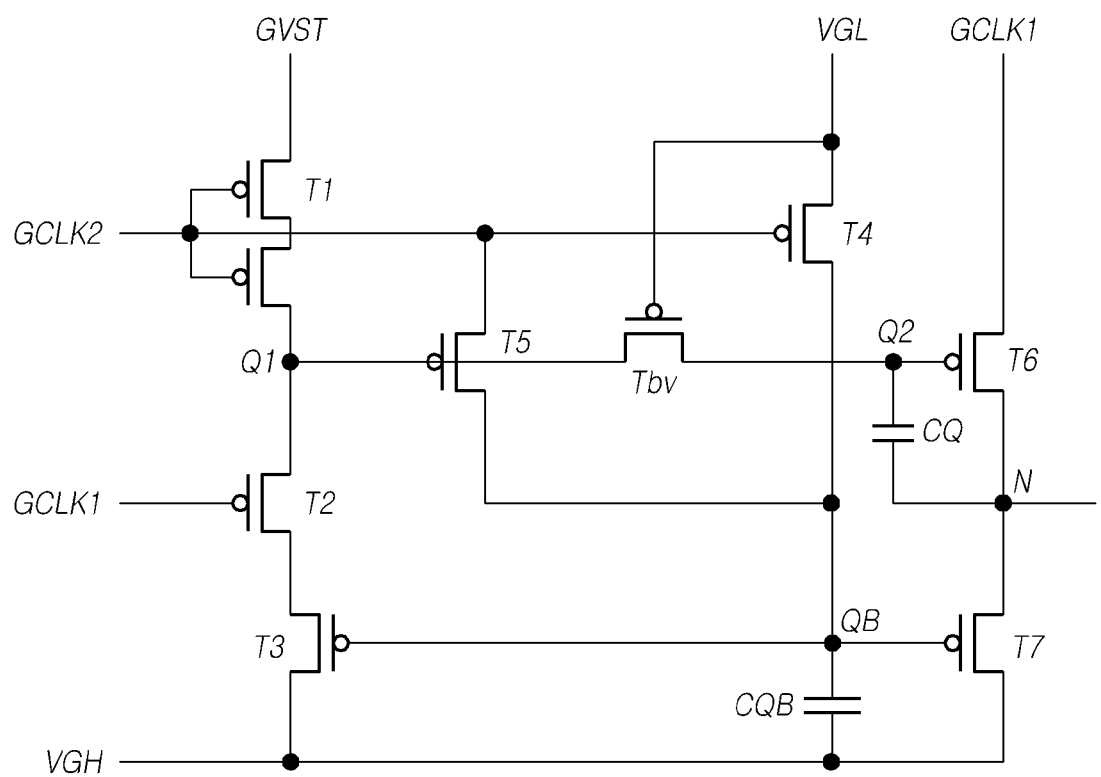
FIG. 6 is a diagram illustrating an example of the gate signal output circuit (GOC) of FIG. 5.

FIG. 6 is a diagram illustrating an example of the gate signal output circuit (GOC) of FIG. 5.

Referring to FIG. 6, the gate signal output circuit GOC according to the embodiments of the present specification may include first to seventh transistors T1 to T7, an auxiliary transistor Tbv, a first capacitor CQ, and a second capacitor CQB.

The first transistor T1 is switched according to the second gate clock signal GCLK2 to supply the start signal GVST to the Q1 node Q1. As shown in FIG. 6, in some cases, two first transistors T1 may be connected in series with each other. In this case, the second gate clock signal GCLK2 may be input to each of the gate nodes of the two first transistors T1.

The second transistor T2 is switched according to the first gate clock signal GCLK1 so that either the source electrode or the drain electrode is electrically connected to the Q1 node Q1.

The third transistor T3 is switched according to the potential of the QB node QB to supply the high potential gate voltage VGH to either the source electrode or the drain electrode of the second transistor T2.

The fourth transistor T4 is switched according to the second gate clock signal GCLK2 to supply the low-potential gate voltage VGL to the QB node QB.

The fifth transistor T5 is switched according to the potential of the Q1 node Q1 to supply the second gate clock signal GCLK2 to the QB node QB.

The sixth transistor T6 is an output buffer whose operation is controlled according to the potential of the Q2 node Q2. When the sixth transistor T6 is activated when the Q2 node Q2 is the low-potential gate voltage VGL, the sixth transistor T6 outputs a scan signal of the low-potential gate voltage VGL to the output node N.

The seventh transistor T7 is an output buffer whose operation is controlled according to the potential of the QB node QB. The seventh transistor T7 outputs a scan signal of the high potential gate voltage VGH to the output node N when the QB node QB is activated with the high potential gate voltage VGH.

The auxiliary transistor Tbv maintains a turned-on state by the low-potential gate voltage VGL. The auxiliary transistor Tbv maintains the voltages of the Q1 node Q1 and the Q2 node Q2 substantially the same.

The first capacitor CQ is connected between the Q2 node Q2 and the output node N, and may be configured to store the voltage of the Q2 node Q2.

The second capacitor CQB is connected between the QB node QB and the input terminal of the high potential gate voltage VGH, and may be configured to store the voltage of the QB node QB.

Figure 7:
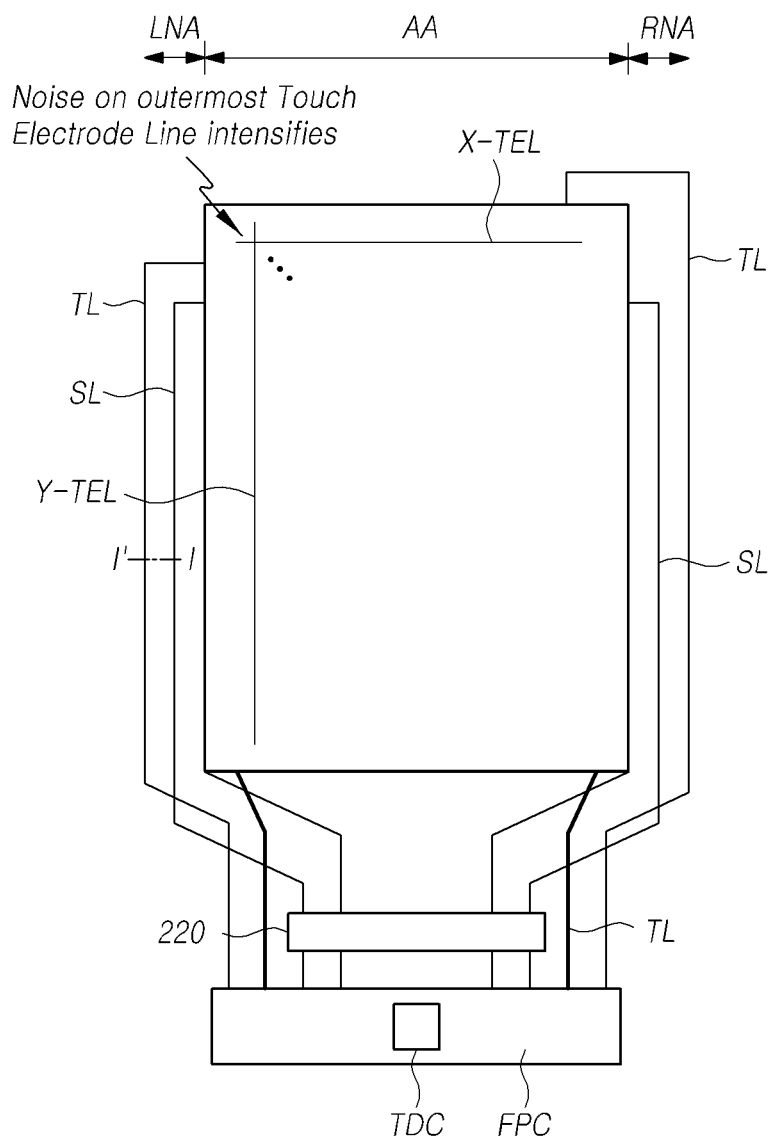
FIG. 7 is a diagram for explaining why touch sensing accuracy of touch electrodes adjacent to a non-active area is low in a touch display device according to embodiments of the present specification.

FIG. 7 is a diagram for explaining why touch sensing accuracy of touch electrodes adjacent to a non-active area is low in a touch display device according to embodiments of the present specification.

Referring to FIG. 7, in the touch display device 100 (see FIG. 1) according to embodiments of the present specification, touch routing wires TL and signal lines SL are positioned in a non-active area (e.g., LNA, RNA) outside the active area AA.

As described above, the touch routing lines TL are electrically connected to the X-touch electrode lines X-TEL and the Y-touch electrode lines Y-TEL disposed on the touch panel, and the X-touch electrode lines X-TEL and the Y-touch electrode lines Y-TEL include one or more touch electrodes.

Meanwhile, a gate-in-panel (GIP) type gate driving circuit may be disposed in at least one of the non-active areas LNA and RNA on both sides of the display panel.

The gate driving circuit receives a gate clock signal (e.g., GCLK1, GCLK2, etc.; see FIG. 6) and outputs the gate signal to the gate lines. These gate clock signals (e.g., GCLK1, GCLK2, etc.; hereinafter abbreviated as GCLK) may be input to the gate driving circuit through the signal lines SL positioned in the non-active area LNA and RNA.

Both the touch routing lines TL and the signal lines SL may be disposed in the non-active area LNA and RNA. In order to prevent a problem of mutual interference between the touch routing lines TL and the signal lines SL, the touch routing lines TL and the signal lines SL may be disposed on different layers. In addition, in order to prevent a problem that interference occurs between the touch routing lines TL and the signal lines SL, a shielding electrode (not shown) may be disposed between the touch routing lines TL and the signal lines SL.

However, in the process of forming the shielding electrode, if the shielding electrode is incompletely formed, interference may occur between the touch routing line TL and the signal line SL. The problem of interference between the touch routing line TL and the signal line SL may be particularly large in the outermost touch routing line TL adjacent to the signal line SL transmitting the gate clock signal GCLK.

In the X-touch electrode line X-TEL and the Y-touch electrode line Y-TEL that are electrically connected to the outermost touch routing line TL, a problem of lowering touch sensing accuracy may occur. The above-described problem may be more problematic when the frequency of the gate clock signal GCLK and the frequency of the touch driving signal input to the touch routing line TL are the same or similar.

The touch driving circuit TDC may supply a touch driving signal to the touch panel and detect a touch sensing signal from the touch panel. In this process, due to the interference between the touch routing line TL and the signal line SL, a problem of lowering accuracy of touch sensing in some areas of the touch panel may occur.

Figure 8:
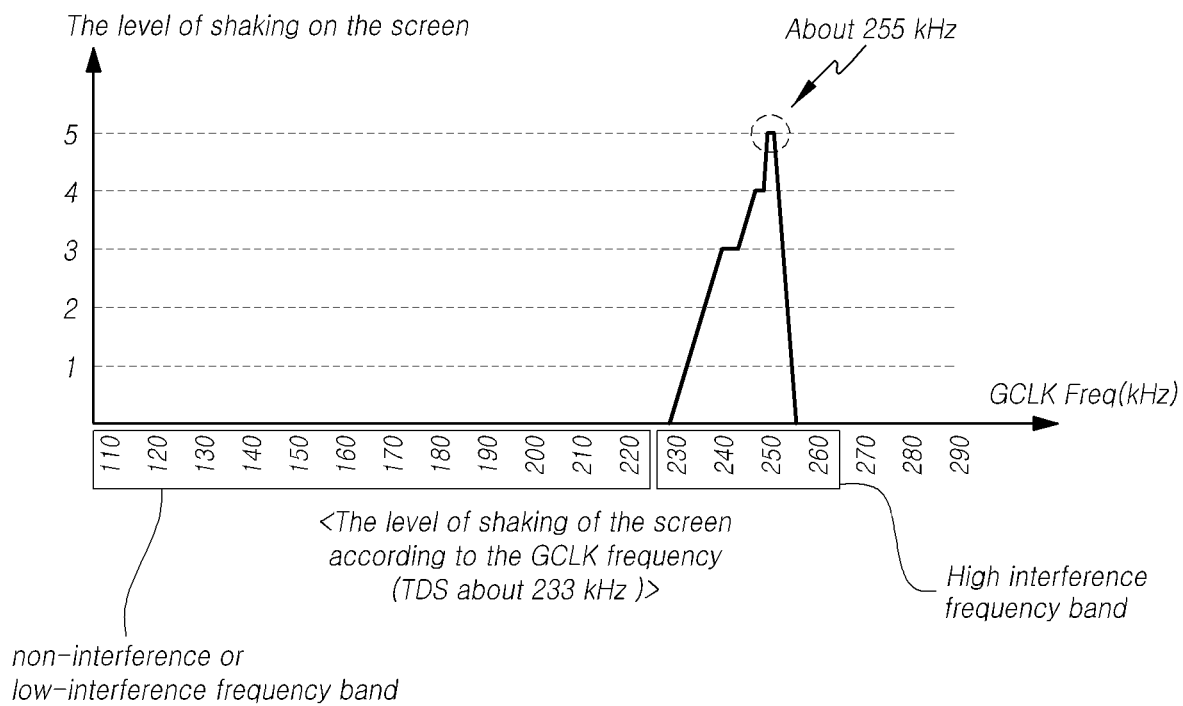
FIG. 8 is a diagram illustrating a change in display quality according to a frequency of a gate clock signal when a frequency of a touch driving signal is constant in a touch display device according to embodiments of the present specification.

FIG. 8 is a diagram illustrating a change in display quality according to a frequency of a gate clock signal when a frequency of a touch driving signal is constant in a touch display device according to embodiments of the present specification.

Referring to FIG. 8, when the frequency of the touch driving signal (hereinafter, abbreviated as TDS) is constant, it can be seen that the level of "screen shaking" (also called "screen flickering") of the touch display device 100 increases, in a range in which the frequency of the gate clock signal GCLK is the same as or similar to the frequency of the touch driving signal TDS.

The screen shaking may be a phenomenon caused by interference between the gate clock signal GCLK and the touch driving signal TDS. That is, when the signal line SL to which the gate clock signal GCLK is input is interfered with by the touch driving signal TDS, screen shaking may occur.

The screen shaking level shown in the graph of FIG. 8 is a relative value. For example, when the screen shake level is 1, the screen shake level at a point in time when the screen shaking is visually recognized by the display panel may be expressed as a relative value. Also, as the relative value of the screen shaking level is greater than 1, the visually recognized screen shaking level may further increase. Also, when the relative value of the screen shaking level is close to 0, the screen shaking phenomenon may be hardly recognized or there may be no screen shaking phenomenon.

For example, referring to FIG. 8, when the frequency of the touch driving signal TDS input to the touch routing line is constant at about 233 kHz, the screen shaking may be recognized in the range where the frequency of the gate clock signal GCLK is about 230 kHz to about 260 kHz.

When the frequency of the touch driving signal TDS is constant, a frequency band of the gate clock signal GCLK in which the screen shaking phenomenon is recognized may be defined as a high interference frequency band.

The frequency band of the gate clock signal GCLK may be defined as a non-interference frequency band or a low-interference frequency band, when the frequency of the touch driving signal is constant and the screen shaking is recognized as less than a certain level, or there is no screen shaking at all.

When the frequency of the touch driving signal TDS is about 233 kHz, a band in which the frequency of the gate clock signal GCLK is 230 kHz or more and 260 kHz or less may be defined as a high interference frequency band. In particular, referring to FIG. 8, when the frequency of the gate clock signal GCLK is 255 kHz, the screen shaking phenomenon may be visually recognized the most.

In addition, a band in which the frequency of the gate clock signal GCLK is less than 230 kHz and a band exceeding 260 kHz may be defined as a non-interference frequency band or a low-interference frequency band.

When the frequency of the gate clock signal GCLK belongs to a non-interference frequency band or a low-interference frequency band, screen shaking may not be visually recognized in the display panel.

Accordingly, in some embodiments, it is beneficial to have a method of converting the frequency band of the gate clock signal GCLK input to the signal line SL from a high interference frequency band to a non-interference frequency band or a low interference frequency band.

Figure 9:
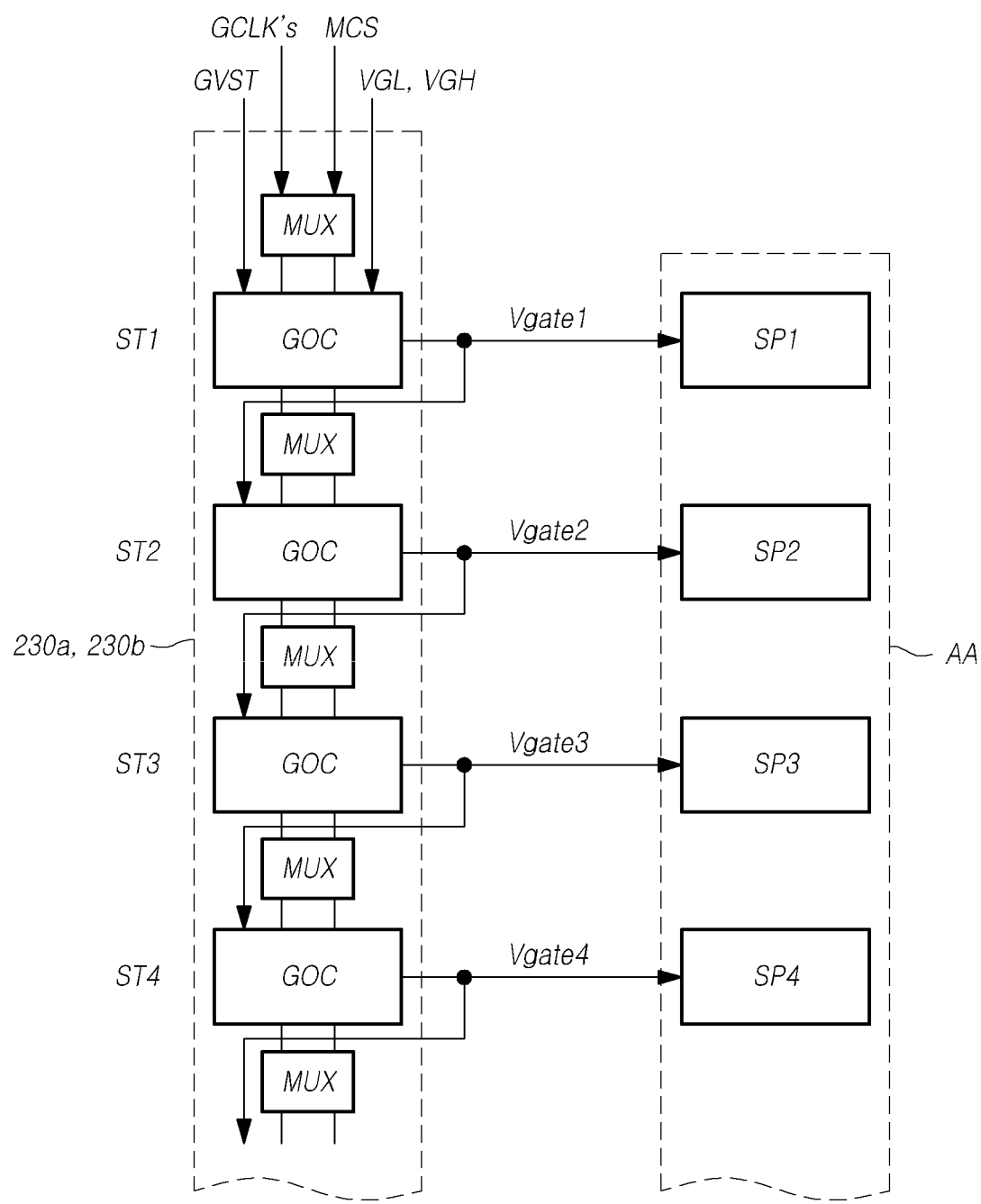
FIG. 9 is a view for explaining a touch display device including a multiplexer.

FIG. 9 is a view for explaining a touch display device including a multiplexer.

Referring to FIG. 9, the touch display device 100 (see FIG. 1) according to embodiments of the present specification includes at least one multiplexer (MUX).

The multiplexer MUX may be located inside the gate driving circuits 230a and 230b. When the gate driving circuits 230a and 230b are positioned in a gate-in-panel (GIP) manner, the multiplexer MUX may be disposed in each stage ST1, ST2, ST3 and ST4, and the like.

Two or more gate clock signals GCLK's are input to the multiplexer MUX. The operation timing of the multiplexer MUX is controlled by a multiplexer control signal (MCS). The multiplexer control signal MCS may be a type of the gate driving circuit control signal GCS.

The multiplexer MUX outputs at least one gate clock signal among the two or more input gate clock signals GCLK's to the gate signal output circuit GOC.

The gate clock signal GCLK's and the multiplexer control signal MCS are transmitted through the signal line SL located in the non-active area NA, and may be entered to the multiplexer MUX of each of the stages ST1, ST2, ST3, and ST4.

Figure 10:
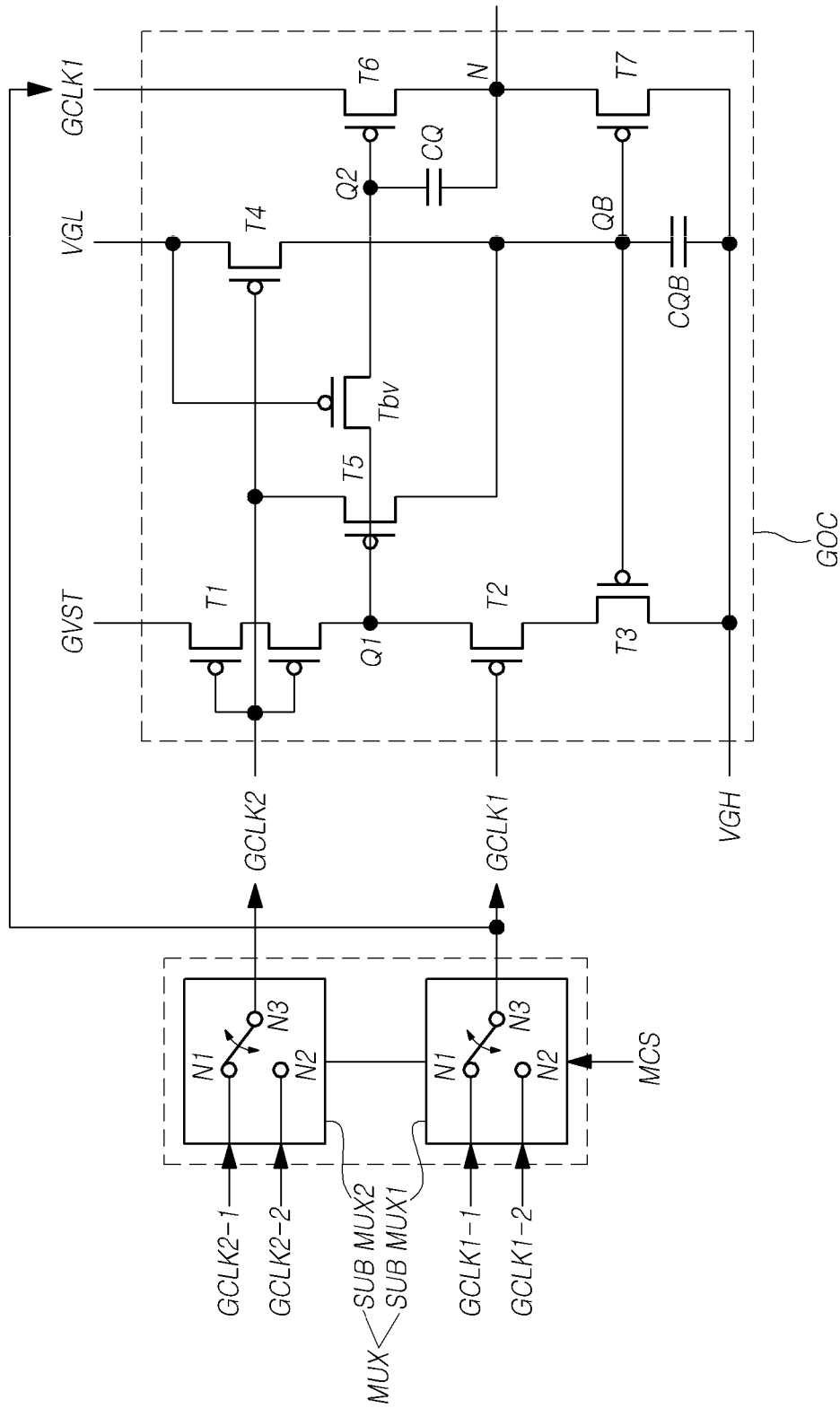
FIG. 10 is a diagram illustrating an example of a gate signal output circuit to which a signal output from a multiplexer is input.
Figure 11:
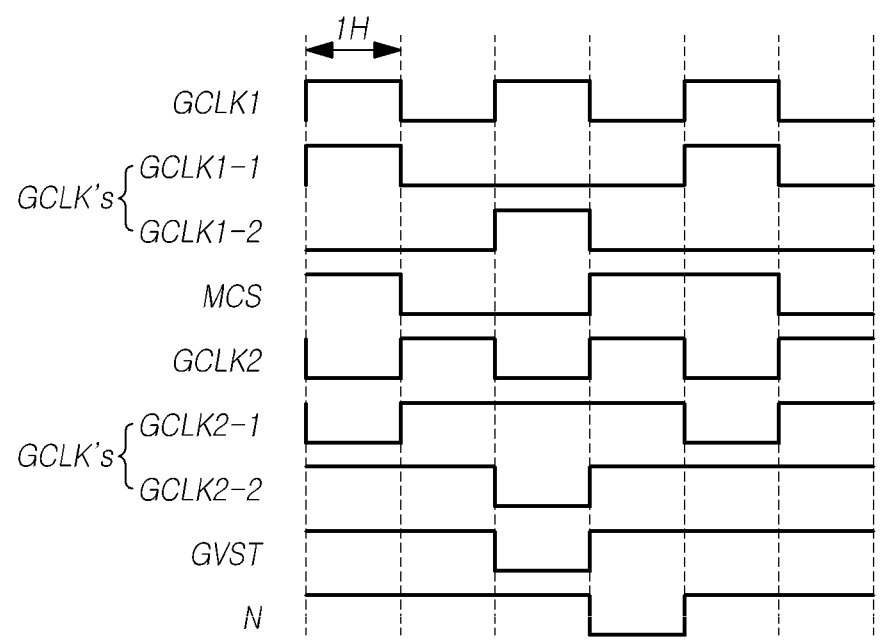
FIG. 11 is a diagram exemplarily showing a timing diagram of a gate clock signal GCLK's and a multiplexer control signal of FIG. 10.

FIG. 10 is a diagram illustrating an example of a gate signal output circuit to which a signal output from a multiplexer is input. FIG. 11 is a diagram exemplarily showing a timing diagram of a gate clock signal GCLK's and a multiplexer control signal of FIG. 10.

Referring to FIG. 10, the multiplexer MUX may include two sub-multiplexers SUB MUX1 and SUB MUX2.

At least two gate clock signals GCLK1-1 and GCLK1-2 are input to the first sub-multiplexer SUB MUX1. The 1-1 gate clock signal GCLK1-1 is input to a first node N1 that is an input node of the first sub-multiplexer SUB MUX1.

The 1-2 gate clock signal GCLK1-2 is input to the second node N2 that is another input node of the first sub-multiplexer SUB MUX1.

The operation timing of the first sub multiplexer SUB MUX1 is determined by the multiplexer control signal MCS. The first sub-multiplexer SUB MUX1 outputs either a signal input to the first node N1 or a signal input to the second node N2 to a third node N3 serving as an output node. The first sub-multiplexer SUB MUX1 may include a switching element whose operation timing is controlled by the multiplexer control signal MCS.

A signal output from the third node N3 of the first sub-multiplexer SUB MUX1 is input to a node (that is, a gate node of the second transistor T2 and a source node or a drain node of the sixth transistor T6) to which the first gate clock signal GCLK1 is input of the gate signal output circuit GOC. Hereinafter, a signal output from the first sub-multiplexer SUB MUX1 and input to the gate node of the second transistor T2 is referred to as a first gate clock signal GCLK1.

Referring to FIGS. 10 and 11, the first sub-multiplexer SUB MUX1 may electrically connect the first node N1 and the third node N3 when the voltage level of the multiplexer control signal MCS is either one of a high level or a low level. The first sub-multiplexer SUB MUX1 may electrically connect the second node N2 and the third node N3 when the voltage level of the multiplexer control signal MCS is either the other of a high level or a low level. In some embodiments, the high voltage level refers to a logic high voltage level (e.g., a logical "1") and the low voltage level refers to a logic low voltage level (e.g., a logical "0").

Meanwhile, at least two gate clock signals GCLK2-1 and GCLK2-2 are input to the second sub-multiplexer SUB MUX2. The 2-1 gate clock signal GCLK2-1 is input to the first node N1 which is an input node of the second sub-multiplexer SUB MUX2. The 2-2 gate clock signal GCLK2-2 is input to the second node N2, which is another input node of the second sub multiplexer SUB MUX2. The second sub-multiplexer SUB MUX2 may include a switching element whose operation timing is controlled by the multiplexer control signal MCS.

The operation timing of the second sub multiplexer SUB MUX2 is determined by the multiplexer control signal MCS. The second sub-multiplexer SUB MUX2 outputs either a signal input to the first node N1 or a signal input to the second node N2 to a third node N3 serving as an output node. The second sub-multiplexer SUB MUX2 may include a switching element whose operation timing is controlled by the multiplexer control signal MCS.

A signal output from the third node N3 of the second sub-multiplexer SUB MUX2 is input to a node (that is, a gate node of the first transistor T1 and a gate node of the fourth transistor T4) to which the second gate clock signal GCLK2 is input of the gate signal output circuit GOC. Hereinafter, a signal output from the second sub-multiplexer SUB MUX2 and input to the gate node of the first transistor T1 is referred to as a second gate clock signal GCLK2.

Referring to FIGS. 10 and 11, the second sub-multiplexer SUB MUX2 may electrically connect the first node N1 and the third node N3 when the voltage level of the multiplexer control signal MCS is either one of a high level or a low level. The second sub-multiplexer SUB MUX2 may electrically connect the second node N2 and the third node N3 when the voltage level of the multiplexer control signal MCS is either the other of a high level or a low level.

The multiplexer control signal MCS input to the first sub-multiplexer SUB MUX1 and the second sub-multiplexer SUB MUX2 may be the same signal. One input line configured to transmit the multiplexer control signal MCS is disposed in the non-active area NA, so that both sub-multiplexers SUB MUX1 and SUB MUX2 may be controlled.

Hereinafter, for convenience of description, it is assumed that the first sub-multiplexer SUB MUX1 and the second sub-multiplexer SUB MUX2, electrically connect the first node N1 and the third node N3 when the voltage level of the multiplexer control signal MCS is at a high level, and electrically connect the second node N2 and the third node N3 when the voltage level of the multiplexer control signal MCS is at a low level.

Referring to FIG. 11, the frequencies of the 1-1 gate clock signal GCLK1-1 and the 1-2 gate clock signal GCLK1-2, input to the first sub-multiplexer SUB MUX1, are ½ (half) of the frequency of the first gate clock signal GCLK1 input to the gate signal output circuit GOC.

In addition, the frequencies of the 2-1 gate clock signal GCLK2-1 and the 2-2 gate clock signal GCLK2-2, input to the second sub-multiplexer SUB MUX2, are ½ (half) of the frequency of the second gate clock signal GCLK2 input to the gate signal output circuit GOC.

During a period in which the voltage level of the multiplexer control signal MCS is at a high level, the multiplexer MUX outputs the 1-1 gate clock signal GCLK1-1 and the 2-1 gate clock signal GCLK2-1 respectively as a gate signal to the gate signal output circuit GOC.

During a period in which the voltage level of the multiplexer control signal MCS is at a low level, the multiplexer MUX may output the 1-2 gate clock signal GCLK1-2 and the 2-2 gate clock signal GCLK2-2 respectively to the gate signal output circuit GOC.

Each of the 1-1 gate clock signal GCLK1-1 and the 1-2 gate clock signal GCLK1-2 includes a high level voltage period of one horizontal signal period 1H, and a low level voltage period of three horizontal signal period 3H during one period. Each of the 2-1 gate clock signal GCLK2-1 and the 2-2 gate clock signal GCLK2-2 includes a low level voltage period of one horizontal signal period 1H, and a high level voltage period of three horizontal signal period 3H during one period.

The phase difference between the 1-1 gate clock signal GCLK1-1 and the 1-2 gate clock signal GCLK1-2 is 180 degrees (180°). The phase difference between the 2-1 gate clock signal GCLK2-1 and the 2-2 gate clock signal GCLK2-2 is 180 degrees (180°).

In a period in which the voltage level of the 1-1 gate clock signal GCLK1-1 is at a high level, the voltage level of the 2-1 gate clock signal GCLK2-1 is at a low level. In a period in which the voltage level of the 1-1 gate clock signal GCLK1-1 is at a low level, the voltage level of the 2-1 gate clock signal GCLK2-1 is at a high level.

In a period in which the voltage level of the 1-2 gate clock signal GCLK1-2 is at a high level, the voltage level of the 2-2 gate clock signal GCLK2-2 is at a low level. In a period in which the voltage level of the 1-2 gate clock signal GCLK1-2 is at a low level, the voltage level of the 2-2 gate clock signal GCLK2-2 is at a high level.

The multiplexer control signal MCS is a signal having a high-level voltage period of two horizontal signal periods 2H and a low-level voltage period of two horizontal signal periods 2H for one period.

The length of a period of multiplexer control signal MCS may be the same as the 1-1 gate clock signal GCLK1-1, the 1-2 gate clock signal GCLK1-2, the 2-1 gate clock signal GCLK2-1 and the 2-2 gate clock signal GCLK2-2. As an example, the period of the signals may equal to 4 horizontal periods 4H.

The length of one horizontal period 1H may be defined as a length of a period in which the gate signal Vgate of the turn-on level voltage is input to the sub-pixel SP.

Hereinafter, with reference to FIG. 11, a 1-1 gate clock signal GCLK1-1, a gate clock signal GCLK1-2, a 2-1 gate clock signal GCLK2-1 and a 2-2 gate clock signal GCLK2-2 in one period of the multiplexer control signal MCS, will be described.

Referring to FIG. 11, during the first horizontal period, the voltage level of the multiplexer control signal MCS is at a high level, and the multiplexer MUX outputs a 1-1 gate clock signal GCLK1-1 and a 2-1 gate clock signal GCLK2-1.

Accordingly, a high level of 1-1 gate clock signal GCLK1-1 is input to the first gate clock signal input node of the gate signal output circuit GOC, and a low level of 2-1 gate clock signal GCLK2-1 is input to the second gate clock signal input node of the gate signal output circuit GOC.

Referring to FIG. 11, during the second horizontal signal period, the voltage level of the multiplexer control signal MCS is at a low level, and the multiplexer MUX outputs the 1-2 gate clock signal GCLK1-2 and the 2-2 gate clock signal GCLK2-2.

Accordingly, a low level of 1-2 gate clock signal GCLK1-2 is input to the first gate clock signal input node of the gate signal output circuit GOC, and a high level of 2-2 gate clock signal GCLK2-2 is input to the second gate clock signal input node of the gate signal output circuit GOC.

Referring to FIG. 11, during the third horizontal signal period, the voltage level of the multiplexer control signal MCS is at a low level, and the multiplexer MUX outputs the 1-2 gate clock signal GCLK1-2 and the 2-2 gate clock signal GCLK2-2.

Accordingly, a high level of 1-2 gate clock signal GCLK1-2 is input to the first gate clock signal input node of the gate signal output circuit GOC, and a low level of 2-2 gate clock signal GCLK2-2 is input to the second gate clock signal input node of the gate signal output circuit GOC.

Referring to FIG. 11, during the fourth horizontal signal period, the voltage level of the multiplexer control signal MCS is at a high level, and the multiplexer MUX outputs the 1-1 gate clock signal GCLK1-1 and the 2-1 gate clock signal GCLK2-1.

Accordingly, a low level of 1-1 gate clock signal GCLK1-1 is input to the first gate clock signal input node of the gate signal output circuit GOC, and a high level of 2-1 gate clock signal GCLK2-1 is input to the second gate clock signal input node of the gate signal output circuit GOC.

In summary, by using four gate clock signals GCLK1-1, GCLK1-2, GCLK2-1 and GCLK2-2 having a length of one period of four horizontal periods 4H, it is possible to generate two gate clock signals GCLK1 and GCLK2 having a period of two horizontal periods 2H.

The gate signal output circuit GOC may operate as in FIG. 6 described above, and below, driving of the gate signal output circuit GOC will be briefly described with reference to FIGS. 10 and 11.

In the first horizontal period and the second horizontal period, the start signal GVST has a high level voltage, and the gate signal output circuit GOC outputs the high potential gate voltage VGH from the output node N. A gate signal Vgate of a turn-off level voltage (e.g., a high potential gate voltage VGH) is output to the output node N.

In the third horizontal period, the start signal GVST has a low level voltage, and the gate signal output circuit GOC outputs the high potential gate voltage VGH at the output node N. At the same time, the voltage output from the output node N may be referred to as a voltage of a signal input to the input node of the first gate clock signal GCLK1. A gate signal of a turn-off level voltage (e.g., a high potential gate voltage VGH) is output to the output node N.

In the fourth horizontal period, the start signal GVST has a high level voltage. The gate signal output circuit GOC outputs a signal input from the output node N to the first gate clock signal GCLK1 input node. Here, the signal output from the output node N is a gate signal of a turn-on level voltage (e.g., a low potential gate voltage VGL).

In the fifth and sixth horizontal periods, the start signal GVST has a high level voltage, and the gate signal output circuit GOC outputs the high potential gate voltage VGH to the output node N. A gate signal having a turn-off level voltage is output to the output node N.

Accordingly, the gate signal output circuit GOC may output a signal such as a waveform output from the output node N as a gate signal. The output gate signal may be input to the sub-pixel SP through the gate line.

Referring to FIGS. 9 to 11, in the gate driving circuits 230*a* and 230*b* according to the embodiments of the present specification, a multiplexer MUX may be disposed in each stage ST1, ST2, ST3, ST4, and the like. Through the signal line SL, the 1-1 gate clock signal GCLK1-1, the 1-2 gate clock signal GCLK1-2, the 2-1 gate clock signal GCLK2-1, the 2-2 gate clock signal GCLK2-2, the start signal GVST, and the multiplexer control signal MCS are transmitted to the gate driving circuits 230*a* and 230*b*.

The frequency of the gate clock signals (e.g., GCLK1-1 to GCLK2-2) transmitted to the gate driving circuits 230*a* and 230*b* through the signal line SL may be about half of the frequency of the first gate clock signal GCLK1 and the frequency of the second gate clock GCLK2.

Accordingly, in the touch display device 100 according to the embodiments of the present specification, a problem may be resolved in which the touch sensing accuracy of the touch electrodes adjacent to the non-active area NA is lowered or the screen shaking of the active area AA, even if the frequencies of the first gate clock signal GCLK1 and the second gate clock signal GCLK2 are included in the interference frequency band.

Figure 12:
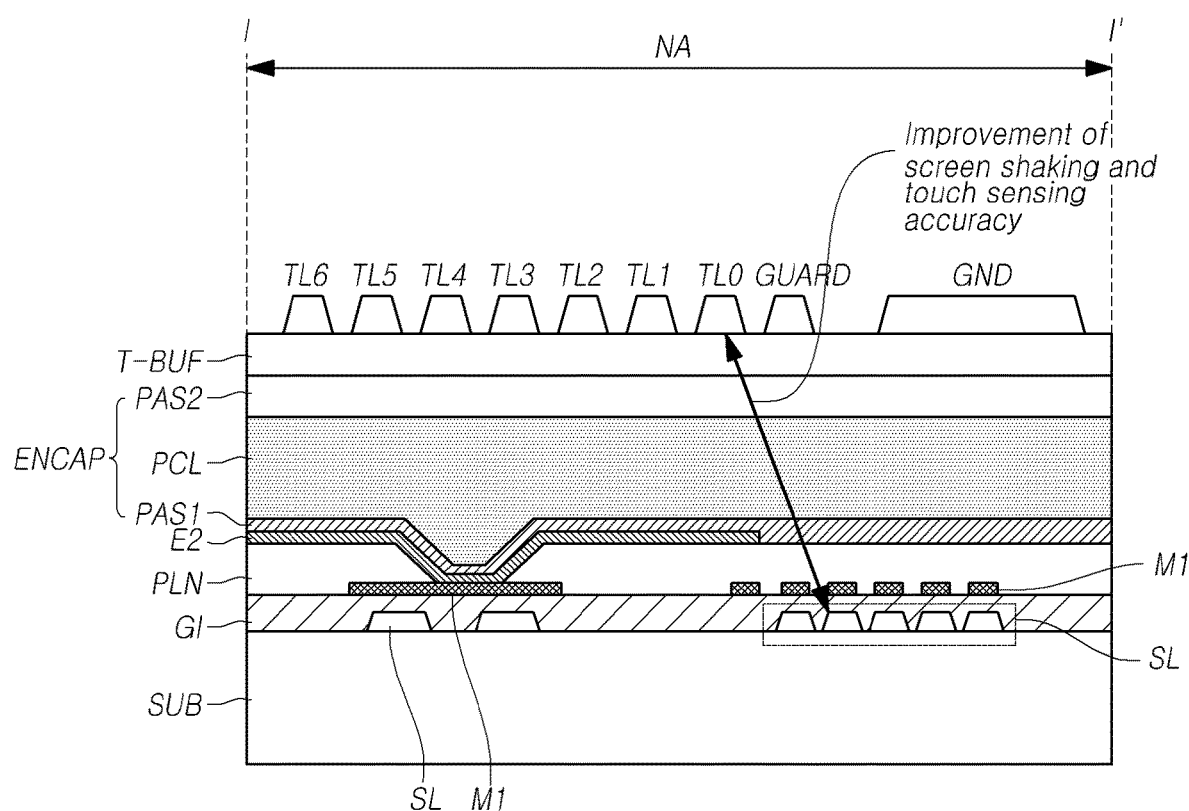
FIG. 12 is an example of a cross-sectional structure cut along line I-I' of FIG. 7.

FIG. 12 is an example of a cross-sectional structure cut along line I-I' of FIG. 7.

Referring to FIG. 12, according to the embodiments of the present specification, a plurality of signal lines SL and a plurality of touch routing lines (e.g., TL0 to TL6) may be located in the non-active area NA of the touch display device 100.

The plurality of signal lines SL may be disposed on the substrate SUB, and a gate insulating layer GI is disposed on the plurality of signal lines SL. The plurality of signal lines SL shown in FIG. 12 may be configured to transmit the gate clock signal GCLK's and the multiplexer control signal MCS to the gate driving circuits 230*a* and 230*b*.

For example, referring to FIG. 12, the plurality of signal lines SL may include one or more wirings that transmit a gate clock signal for generating the scan signal SCAN. The plurality of signal lines SL may include one or more wirings that transmit a gate clock signal for generating the light emitting signal EM. The plurality of signal lines SL may include one or more wirings for transmitting the multiplexer control signal MCS for controlling the multiplexer MUX.

Although not shown, the touch display device 100 according to the embodiments of the present specification may further include a gate signal output circuit GOC configured to generate a light emitting signal, a plurality of lines configured to transmit four gate clock signals GCLK's, a multiplexer MUX disposed in front edge of the gate signal output circuit GOC, and a line configured to transmit the multiplexer control signal MCS for controlling the multiplexer MUX and the like.

The plurality of signal lines SL may be disposed to face the first metal M1 with the gate insulating layer GI interposed therebetween.

Here, the first metal M1 may function as a shielding electrode to prevent interference between the signal line SL and the touch routing wiring TL. The first metal M1 may be in a floating state to which no constant voltage is applied, but a constant voltage (e.g., ELVSS) may be applied to the first metal M1.

The first metal M1 disposed in the non-active area NA may be electrically connected to the second electrode E2 extending from the active area AA. The second electrode E2 may be electrically connected to the first metal M1 through a contact hole in which a portion of the planarization layer PLN on the first metal M1 is removed.

The second electrode E2 may be an electrode configured to apply the common voltage ELVSS to the light emitting devices ED included in the plurality of sub-pixels SP in the active area AA.

The second electrode E2 may extend in a direction from the inner portion I of the non-active area NA to the outer portion I'. The second electrode E2 may function as a shielding electrode to prevent interference between the plurality of signal lines SL and the touch routing lines TL.

An encapsulation unit ENCAP is disposed on the second electrode E2. The encapsulation unit ENCAP may be disposed as one layer, or may be disposed as a plurality of layers PAS1, PCL, and PAS2. For example, when the encapsulation unit ENCAP consists of a plurality of layers PAS1, PCL, and PAS2, the encapsulation unit ENCAP may include one or more inorganic encapsulation layers PAS1 and PAS2 and one or more organic encapsulation layers PCL. For example, the encapsulation unit ENCAP may be disposed in a structure in which the first inorganic encapsulation layer PAS1, the organic encapsulation layer PCL, and the second inorganic encapsulation layer PAS2 are sequentially stacked.

A touch buffer layer T-BUF may be disposed on the encapsulation unit ENCAP.

The touch buffer layer T-BUF may be disposed between the touch routing lines (e.g., TL0 to TL6) and the second electrode E2. The touch buffer layer T-BUF may be designed such that the separation distance between the touch routing lines TL0 to TL6 and the second electrode E2 maintains a predetermined minimum separation distance (e.g., 1 μm). Accordingly, it is possible to reduce or prevent the parasitic capacitance formed between the touch routing lines TL0 to TL6 and the second electrode E2, and through this, it is possible to improve touch sensing accuracy.

The touch routing lines TL0 to TL6 may be disposed on the encapsulation unit ENCAP without the touch buffer layer T-BUF in the non-active area NA. In this case, by increasing the thickness of the second inorganic encapsulation layer PAS2, the touch routing lines TL0 to TL6 may be disposed on the encapsulation unit ENCAP without disposing the touch buffer layer T-BUF.

The touch routing lines TL0 to TL6 disposed in the non-active area NA are electrically connected to the touch electrode lines disposed on the touch panel, respectively. For example, the outermost touch routing line TL0 may be electrically connected to the touch electrode line disposed at the outermost portion of the touch panel.

Referring to FIG. 12, a guard electrode GUARD and a ground electrode GND may be further disposed outside of the outermost touch routing line TL0.

A preset voltage may be applied to the guard electrode GUARD and the ground electrode GND. Accordingly, by means of the guard electrode GUARD and the ground electrode GND, it is possible to reduce/minimize the influence of the touch routing lines TL0 to TL6 by an electromagnetic wave introduced from the outside.

The guard electrode GUARD and the ground electrode GND may be disposed on the same layer as the touch routing lines TL0 to TL6. For example, the touch routing lines TL0 to TL6, the guard electrode GUARD, and the ground electrode GND may be disposed on the touch buffer layer T-BUF. The guard electrode GUARD and the ground electrode GND may be formed of the same material as the touch routing lines TL0 to TL6.

Referring to FIG. 12, between the touch routing lines TL0 to TL6 and the plurality of signal lines SL, the first metal M1 and the second electrode E2 may be disposed as shielding electrodes. That is, the first metal M1 and the second electrode E2 may physically prevent occurring interference between the plurality of touch routing lines TL0 to TL6 and the plurality of signal lines SL.

However, due to a process error, etc., interference may occur between the outermost touch routing line TL0 and a plurality of signal lines SL despite the presence of the first metal M1 and the second electrode E2.

In particular, when the frequency of a signal transmitted to a plurality of signal lines SL is included in a high interference frequency band equal to or similar to the frequency of the signal transmitted to the touch routing lines TL, touch sensing accuracy may be lowered or display quality may be degraded.

The touch display device according to embodiments of the present specification may lower the frequency of a signal (e.g., a gate clock signal) transmitted to the signal lines SL by half by providing a gate driving circuit including a multiplexer.

Accordingly, the frequency band of the signal transmitted to the signal line SL may be different from the frequency of the touch driving signal. For example, a frequency band of a signal transmitted to the signal lines SL may be included in a non-interference frequency band or a low interference frequency band.

At the same time, in the touch display device according to example configurations of this specification, the frequency of the gate signal Vgate input to the gate line GL may be maintained the same as before. Accordingly, it is possible to drive the touch display device at a scanning rate of 120 Hz or more.

Accordingly, touch display device 100 according to example configurations of this specification has the advantage of improving touch sensing accuracy and display quality compared to the conventional one, and enabling high transfer driving.

Embodiments of the present disclosure described above will be briefly described below.

According to aspects of the present disclosure, there is a touch display device 100 including: two or more signal lines SL that transmit clock signals (GCLK's; e.g., GCLK1-1, GCLK1-2, GCLK2-1, GCLK2-2, etc.) having the same frequency and different phases, and a multiplexer MUX including input nodes N1 and N2 which clock signals GCLK's transmitted through the two or more signal lines SL are input and an output node N3 outputting any one of clock signals GCLK's input to the input nodes N1 and N2.

The touch display device 100 may further include a gate driving circuit 230a and 230b including the multiplexer MUX.

The multiplexer MUX may include at least one sub-multiplexer SUB MUX, wherein the two or more signal lines SL are electrically connected to the input nodes N1 and N2.

The gate driving circuit 230a and 230b may further include a gate signal output circuit GOC to which a clock signal GCLK1 and GCLK2 from the multiplexer MUX is input.

The touch display device 100 may further include at least at least one touch routing line disposed in a non-active area, and at least one touch electrode electrically connected to the at least one touch routing line.

A signal line SL to which a multiplexer control signal MCS for controlling an operation timing of the multiplexer MUX is input may be disposed in the non-active area NA, wherein the touch routing line TL is disposed at a layer different from the two or more signal lines SL transmitting the clock signals GCLK's.

The gate driving circuit 230a and 230b may be disposed in a gate-in-panel (GIP) manner.

The touch display device 100 may further include a display panel 210 including an active area AA in which one or more sub-pixels SP are disposed and a non-active area NA around the active area AA, wherein two or more signal lines SL transmitting the clock signals GCLK's and a signal line SL for transmitting a multiplexer control signal MCS for controlling an operation timing of the multiplexer MUX are disposed in the non-active area NA.

A frequency of the multiplexer control signal MCS may be the same as a frequency of the clock signals GCLK's.

The two or more signal lines SL transmitting the clock signals GCLK's may be disposed in the same layer as the signal line transmitting the multiplexer control signal.

Each of the clock signals GCLK's is either a signal for which is a period of high-level voltage is longer than a period of low-level voltage in one period or a signal for which is a period of low-level voltage is longer than a period of high-level voltage in one period.

The multiplexer MUX may include two or more sub-multiplexers SUB MUX1 and SUB MUX2, wherein the same multiplexer control signal MCS is input to the two or more sub-multiplexers SUB MUX1 and SUB MUX2.

According to another aspects of the present disclosure, there is a gate driving circuit 230a and 230b including: a multiplexer MUX including two or more input nodes N1 and N2 and one or more output node N3, and a gate signal output circuit GOC that receives a signal output from an output node N3 of the multiplexer MUX and generates a gate signal Vgate input to a sub-pixel SP.

The frequency of a signal GCLK's input to each of the input nodes N1 and N2 of the multiplexer MUX may be half the frequency of a signal GCLK1 and GCLK2 output from the output node N3 of the multiplexer MUX.

The multiplexer MUX receives signals GCLK's with different lengths of periods with high voltage levels and low voltage levels during one period, respectively, on two or more input nodes N1 and N2.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown. The scope of protection of the present disclosure includes all technical ideas and its equivalents described within the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display apparatus including:
   two or more signal lines, in operation, that transmit clock signals including a same frequency and different phases; and
   a gate driving circuit including a multiplexer,
   wherein the multiplexer having at least two sub-multiplexers, each sub-multiplexer including:
      input nodes through which the clock signals transmitted through the two or more signal lines are input;
      an output node outputting any one of the clock signals input to the input nodes; and
      a multiplexer control signal, that in operation, controls an electrical connection between the input nodes and the output node,
   wherein a frequency of the clock signal input to the input nodes of the multiplexer is half of a frequency of a clock signal input to the gate driving circuit,
   wherein the clock signal input to the first input node of the multiplexer has a high level voltage during a first period and the clock signal input to the gate driving circuit has a high level voltage during a second period, and
   wherein durations of the first period and the second period are the same.

2. The touch display apparatus of claim 1,
   wherein the two or more signal lines are electrically connected to the input nodes.

3. The touch display apparatus of claim 1, the gate driving circuit further including a gate signal output circuit,
   wherein the clock signal input to the gate driving circuit is a clock signal output from the multiplexer is input.

4. The touch display apparatus of claim 1, further including:
   at least one touch routing line disposed in a non-active area of the touch display apparatus; and
   at least one touch electrode electrically connected to the at least one touch routing line.

5. The touch display apparatus of claim 4, wherein a signal line to which a multiplexer control signal for controlling an operation timing of the multiplexer is input is disposed in the non-active area, and wherein the touch routing line is disposed at a layer different from the two or more signal lines transmitting the clock signals.

6. The touch display apparatus of claim 1, wherein the gate driving circuit is disposed in a gate-in-panel manner.

7. The touch display apparatus of claim 1, further including a display panel including an active area in which one or more sub-pixels are disposed and a non-active area adjacent to the active area,
wherein the two or more signal lines transmitting the clock signals and a signal line for transmitting the multiplexer control signal for controlling an operation timing of the multiplexer are disposed in the non-active area.

8. The touch display apparatus of claim 7, wherein a frequency of the multiplexer control signal is a same as the frequency of the clock signals.

9. The touch display apparatus of claim 7, wherein the two or more signal lines transmitting the clock signals are disposed in a same layer as the signal line transmitting the multiplexer control signal.

10. The touch display apparatus of claim 1, wherein each of the clock signals, either a signal which is a period of logic high-level voltage is longer than a period of logic low-level voltage in one period or a signal which is a period of logic low-level voltage is longer than a period of logic high-level voltage in one period.

11. The touch display apparatus of claim 1, further comprising:
an encapsulation unit;
at least one touch routing line disposed on the encapsulation unit at a non-active area of the touch display apparatus; and
at least one touch electrode electrically connected to the at least one touch routing line,
wherein the touch routing line is disposed above the encapsulation unit and the two or more signal lines transmitting the clock signals are disposed beneath the encapsulation unit, and
wherein the touch routing line and the two or more signal lines overlap each other from a plan view.

12. A gate driving circuit including:
a multiplexer including:
two or more input nodes through which clock signals including a same frequency and different phases are input; and
one or more output nodes; and
a gate signal output circuit, in operation, receives a signal output from an output node among the one or more output nodes of the multiplexer and generates a gate signal input to a sub-pixel,
wherein the two or more input nodes include a first input node and a second input node, and
wherein a frequency of the clock signal input to the input nodes of the multiplexer is half of a frequency of a clock signal input to the gate signal output circuit.

13. The gate driving circuit of claim 12, wherein the clock signal output from the output node of the multiplexer is the clock signal input to the gate output circuit.

14. The gate driving circuit of claim 12, wherein the multiplexer receives signals with different lengths of periods with logic high voltage levels and logic low voltage levels during one period, respectively, on two or more input nodes.

15. A touch display apparatus including:
two or more signal lines, in operation, that transmit clock signals including a same frequency and different phases; and
a gate driving circuit including a multiplexer,
wherein the multiplexer includes:
input nodes through which the clock signals transmitted through the two or more signal lines are input;
an output node outputting any one of the clock signals input to the input nodes; and
wherein a frequency of the clock signal input to the input nodes of the multiplexer is half of a frequency of a clock signal input to the gate driving circuit.

16. The touch display apparatus of claim 15,
wherein the two or more signal lines are electrically connected to the input nodes.

17. The touch display apparatus of claim 16, the gate driving circuit further including a gate signal output circuit,
wherein the clock signal input to the gate driving circuit is a clock signal output from the multiplexer.

18. The touch display apparatus of claim 16, further including:
at least one touch routing line disposed in a non-active area of the touch display apparatus; and
at least one touch electrode electrically connected to the at least one touch routing line.

19. The touch display apparatus of claim 18, wherein a signal line to which a multiplexer control signal for controlling an operation timing of the multiplexer is input is disposed in the non-active area, and
wherein the touch routing line is disposed at a layer different from the two or more signal lines transmitting the clock signals.

20. The touch display apparatus of claim 18, wherein the two or more signal lines transmitting the clock signals are disposed in the non-active area.

* * * * *